US012653195B2

(12) United States Patent
Donohue, III et al.

(10) Patent No.: US 12,653,195 B2
(45) Date of Patent: Jun. 16, 2026

(54) PORTABLE MOTORIZED HIGH TEMPERATURE PIZZA OVEN

(71) Applicant: HYPERDESIGN, LLC, Louisville, KY (US)

(72) Inventors: John E. Donohue, III, Louisville, KY (US); Matthew A. Janchar, Weston, MA (US)

(73) Assignee: HYPERDESIGN, LLC, Louisville, KY (US)

( * ) Notice: Subject to any disclaimer, the term of this patent is extended or adjusted under 35 U.S.C. 154(b) by 406 days.

(21) Appl. No.: 18/561,796

(22) PCT Filed: May 19, 2022

(86) PCT No.: PCT/US2022/030041
§ 371 (c)(1),
(2) Date: Nov. 17, 2023

(87) PCT Pub. No.: WO2022/246073
PCT Pub. Date: Nov. 24, 2022

(65) Prior Publication Data
US 2024/0365793 A1 Nov. 7, 2024

Related U.S. Application Data

(60) Provisional application No. 63/191,922, filed on May 21, 2021.

(51) Int. Cl.
A21B 1/52 (2006.01)
A21B 1/28 (2006.01)
A21B 1/44 (2006.01)

(52) U.S. Cl.
CPC .................. *A21B 1/52* (2013.01); *A21B 1/28* (2013.01); *A21B 1/44* (2013.01)

(58) Field of Classification Search
CPC ... F24C 3/14; F24C 3/027; A21B 1/28; A21B 1/44; A21B 1/52; A47J 37/0658; F24B 1/207
See application file for complete search history.

(56) References Cited

U.S. PATENT DOCUMENTS

| | | | |
|---|---|---|---|
| 8,302 | A | 8/1851 | Mason |
| 3,124,057 | A | 3/1964 | Kiser |
| 4,330,696 | A | 5/1982 | Pomeroy |
| 5,836,295 | A | 11/1998 | Faraj |

(Continued)

FOREIGN PATENT DOCUMENTS

| | | |
|---|---|---|
| DE | 202018001787 U1 | 4/2018 |
| WO | WO2019/214840 | 11/2019 |
| WO | WO2021044423 | 3/2021 |

OTHER PUBLICATIONS

European Extended Search Report prepared for European Patent Application No. 22805482.1, mailed Mar. 20, 2025.

(Continued)

*Primary Examiner* — Alfred Basichas
(74) *Attorney, Agent, or Firm* — Barnes & Thornburg LLP

(57) ABSTRACT

A portable, high temperature oven includes a cook chamber, a chimney, a motor assembly, and a removable firebox. The motor drives a cook plate within an interior space of the oven. The motor is positioned outside of the cook chamber. The motor drives the cook plate through an insulative coupler.

20 Claims, 22 Drawing Sheets

(56)        References Cited

U.S. PATENT DOCUMENTS

| | | | |
|---|---|---|---|
| 10,575,680 B2 | 3/2020 | Fagg | |
| 10,624,353 B1 | 4/2020 | Langley | |
| 2007/0108177 A1 | 5/2007 | Engelhardt | |
| 2015/0233585 A1 | 8/2015 | Creel | |
| 2017/0215641 A1 | 8/2017 | Debruler | |
| 2017/0238760 A1* | 8/2017 | Fagg ................... | A47J 37/0786 |
| 2018/0213973 A1 | 8/2018 | Tapaninaho | |

OTHER PUBLICATIONS

PCT Search Report and Written Opinion prepared for PCT Application No. PCT/US2022/030041, completed Jul. 19, 2022.

\* cited by examiner

PORTABLE MOTORIZED HIGH TEMPERATURE PIZZA OVEN

CROSS-REFERENCE TO RELATED APPLICATIONS

This application is a national stage entry under 35 USC § 371 (b) of PCT International Application No. PCT/US2022/030041, filed May 19, 2022, which claims priority under 35 U.S.C. § 119 (e) to U.S. Provisional Application Ser. No. 63/191,922 filed on May 21, 2021, the entire disclosures of both of which are incorporated herein by reference.

TECHNICAL FIELD

The present disclosure is related to portable high temperature ovens for use in preparing baked goods. More specifically, the present disclosure is directed to a portable high temperature pizza oven capable of using either solid materials or gas as a fuel source.

BACKGROUND

The popularity of homemade pizza is growing along with an interest in making pizza in a traditional way, such as through the use of brick ovens. The cost of a traditional brick oven to build and operate is prohibitive to many people. Still further, such an oven has a limited use in single location.

Many people partake in outdoor cooking, such as grilling out or smoking food. This extends to activities away from home such as camping or tailgating prior to sporting or music events. With the ever increasing interest in such actives, there has been tremendous growth in portable cooking appliances such as portable grills, portable smokers, and the like. However, the ability to cook certain foodstuffs with portable cooking equipment has been limited due to the excessive size or lack of portability of high quality cooking appliances that can be operated remotely.

With this background, a need for a quality portable powered oven suitable for cooking pizza and bread has been identified. The present disclosure addresses the limitations of the ability to prepare pizza, bread, and other high temperature foodstuffs in a traditional brick oven through a different approach.

SUMMARY

The present disclosure includes one or more of the features recited in the appended claims and/or the following features which, alone or in any combination, may comprise patentable subject matter.

According to a first aspect of the present disclosure, a portable, high temperature oven includes a cook chamber, a chimney, a motor assembly, a drive shaft, and a firebox. The cook chamber defines an interior space. The cook chamber includes a housing, a rotatable cook plate positioned in the interior space, and a rotatable frame supporting the cook plate. The rotatable frame is movable relative to the housing. The housing defines a concave upper surface bounding the interior space, the concave upper surface positioned to overlie the rotatable cook plate. There is a channel positioned above the concave upper surface and the channel is configured to direct a flow of hot air from below the concave upper surface back over the concave upper surface.

The chimney provides a flow path for the hot air after exiting the cook chamber. The motor assembly is positioned below the cook chamber. There is a drive shaft extending between the motor assembly and a thermally insulative coupler. There is a pin extending between the coupler and the rotatable frame such that rotation of the motor is transferred through the shaft, to the coupler, to the pin, and to the rotatable frame to rotate the cook plate. The firebox is removably coupleable to the cook chamber and configured to inject a flame into the interior space of the cook chamber between the cook plate and the concave upper surface.

In some embodiments of the first aspect, the firebox is a solid fuel firebox including a combustion chamber and an air channel that is operable to direct ambient air through the combustion chamber, the firebox configured to cause a flame to be extended into the interior space.

In some embodiments of the first aspect, the cook chamber includes collapsible legs.

In some embodiments of the first aspect, the firebox includes removable legs.

In some embodiments of the first aspect, the firebox includes a door providing access to a chute for feeding solid fuel to the combustion chamber.

In some embodiments of the first aspect, the combustion chamber has a grated lower surface.

In some embodiments of the first aspect, the flow of air through the combustion chamber flows through a grate.

In some embodiments of the first aspect, the chimney is removably attachable to the cook chamber.

In some embodiments of the first aspect, the cook chamber includes a carry handle. In some embodiments of the first aspect, the cook chamber includes a door. In some embodiments of the first aspect, the cook chamber includes a window.

In some embodiments of the first aspect, the motor assembly is battery powered. In some embodiments of the first aspect, the motor assembly is removably secured to the cook chamber.

In some embodiments of the first aspect, the upper portion of the cook chamber is double-walled.

In some embodiments of the first aspect, the firebox is a propane fuel firebox including a propane jet burner configured to cause a flame to be extended into the interior space. In some embodiments of the first aspect, the firebox includes a plurality of propane jet burners. In some embodiments of the first aspect, the firebox is suspended from the cook chamber. In some embodiments of the first aspect, the firebox includes electric ignitors.

According to a second aspect of the present disclosure, a cook chamber for a portable high temperature oven comprises a housing, a rotatable cook plate, and a rotatable frame. The housing defines an interior space. The rotatable cook plate is positioned in the interior space. The rotatable frame supports the cook plate and is movable relative to the housing. The housing defines the interior space with a concave upper surface bounding the interior space, the concave upper surface positioned to overlie the rotatable cook plate, and a channel positioned above the concave upper surface, the channel configured to direct a flow of hot air from below the concave upper surface back over the concave upper surface.

In some embodiments of the second aspect, the cook chamber includes collapsible legs.

In some embodiments of the second aspect, the cook chamber includes a carry handle.

In some embodiments of the second aspect, the cook chamber includes a door.

In some embodiments of the second aspect, the cook chamber includes a window.

In some embodiments of the second aspect, the window is positioned in the door.

In some embodiments of the second aspect, the upper portion of the cook chamber is double-walled.

According to a third aspect of the present disclosure, a portable, high temperature oven comprises a cook chamber, a chimney, and means for injecting a flame into the interior space of the cook chamber between the cook plate and the concave upper surface. The cook chamber defines an interior space, the cook chamber including a housing, and a channel positioned above the concave upper surface, the channel configured to direct a flow of hot air from below the concave upper surface back over the concave upper surface. The chimney is exhausting the flow of hot air that has been directed back over the concave upper surface out of the cook chamber.

In some embodiments of the third aspect, the oven further comprises a rotatable cook plate positioned in the interior space, a rotatable frame supporting the cook plate, the rotatable frame movable relative to the housing, the housing defining a concave upper surface bounding the interior space, the concave upper surface positioned to overlie the rotatable cook plate.

In some embodiments of the third aspect, the oven further comprises a motor assembly positioned below the cook chamber, a drive shaft extending between the motor assembly and a thermally insulative coupler, a pin extending between the coupler and the rotatable frame such that rotation of the motor is transferred through the shaft, to the coupler, to the pin, and to the rotatable frame to rotate the cook plate.

In some embodiments of the third aspect, the motor assembly is battery powered.

In some embodiments of the third aspect, the motor assembly is removably secured to the cook chamber.

In some embodiments of the third aspect, the means for injecting a flame into the interior space of the cook chamber comprises a solid fuel firebox, the firebox configured to cause a flame to be extended into the interior space.

In some embodiments of the third aspect, the cook chamber includes collapsible legs.

In some embodiments of the third aspect, the firebox includes removable legs.

In some embodiments of the third aspect, the firebox includes a door providing access to a chute for feeding solid fuel to the combustion chamber.

In some embodiments of the third aspect, the chimney is removably attachable to the cook chamber.

In some embodiments of the third aspect, the cook chamber includes a carry handle.

In some embodiments of the third aspect, the cook chamber includes a door.

In some embodiments of the third aspect, the cook chamber includes a window.

In some embodiments of the third aspect, the upper portion of the cook chamber is double-walled.

In some embodiments of the third aspect, the means for injecting a flame into the interior space of the cook chamber comprises a propane fuel firebox including a propane jet burner configured to cause a flame to be extended into the interior space.

In some embodiments of the third aspect, the firebox includes a plurality of propane jet burners.

In some embodiments of the third aspect, the firebox includes electric ignitors.

In some embodiments of the third aspect, the chimney is removably attachable to the cook chamber.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
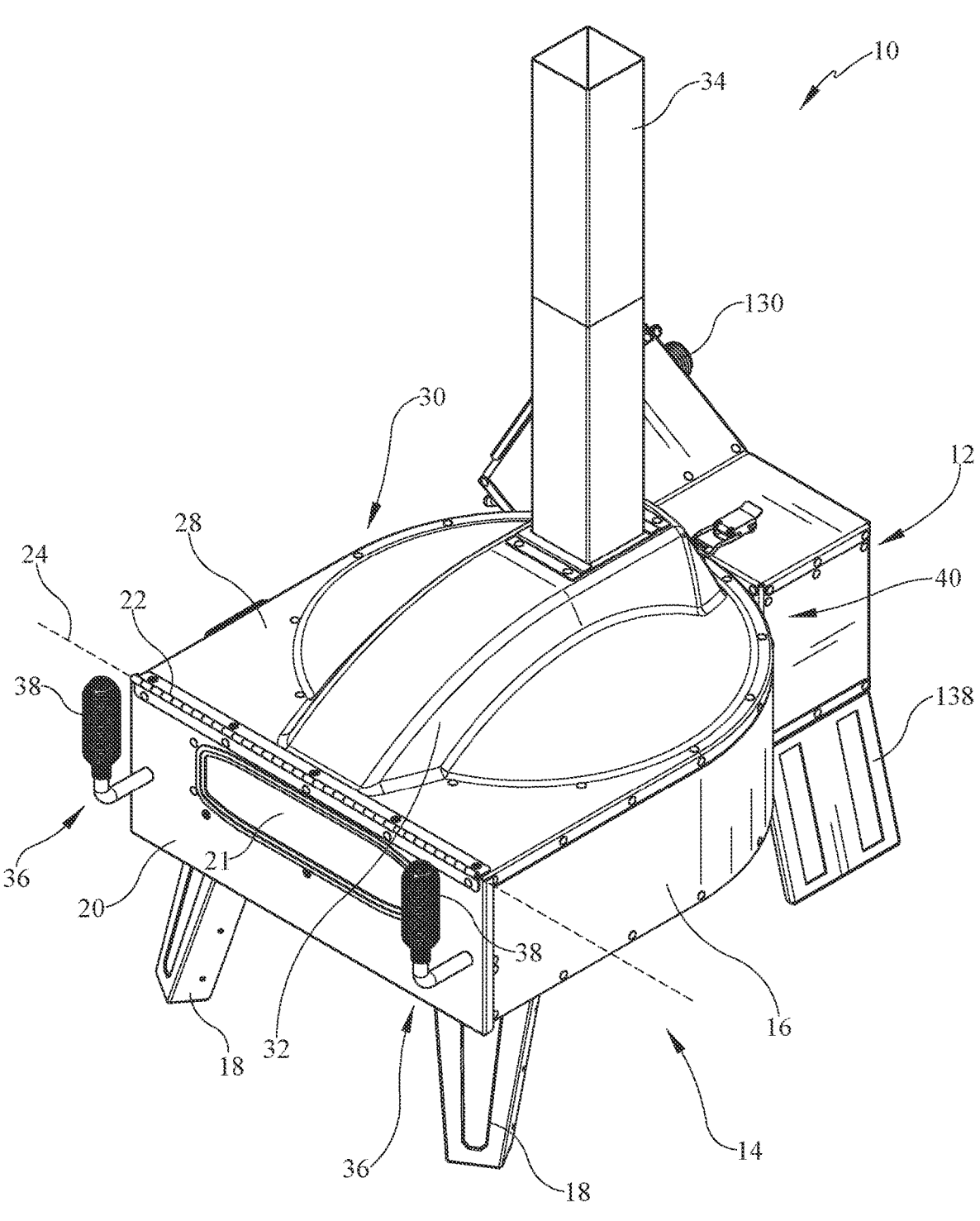
FIG. 1 is a perspective view of a portable high temperature oven with a first embodiment of a firebox according to the present disclosure, the view in FIG. 1 taken from above the right side of the oven.

A portable high temperature oven 10 configured to bake food products, such as pizza, for example, includes a detachable firebox 12 and a cook chamber 14 as shown in FIG. 1. The firebox 12 is removably attachable to the cook chamber 14 to allow the oven 10 to be broken down to be transported. This allows the oven 10 to be transported to be used at remote locations, such as a camp site, for example. In the illustrative embodiment, the cook chamber 14 includes a housing 16 that is supported on a plurality of collapsible legs 18 that are adjustable to fold against the housing 16 to reduce the profile of the cook chamber 14 for transportation.

The disclosed structures are generally made of 304 stainless steel, where appropriate, and of high temperature ceramics where appropriate. This is due to the fact that the temperatures inside of the oven 10 can reach greater than 900 degrees. Thus, an important aspect of the components of the system are the high temperature performance.

Figure 5:
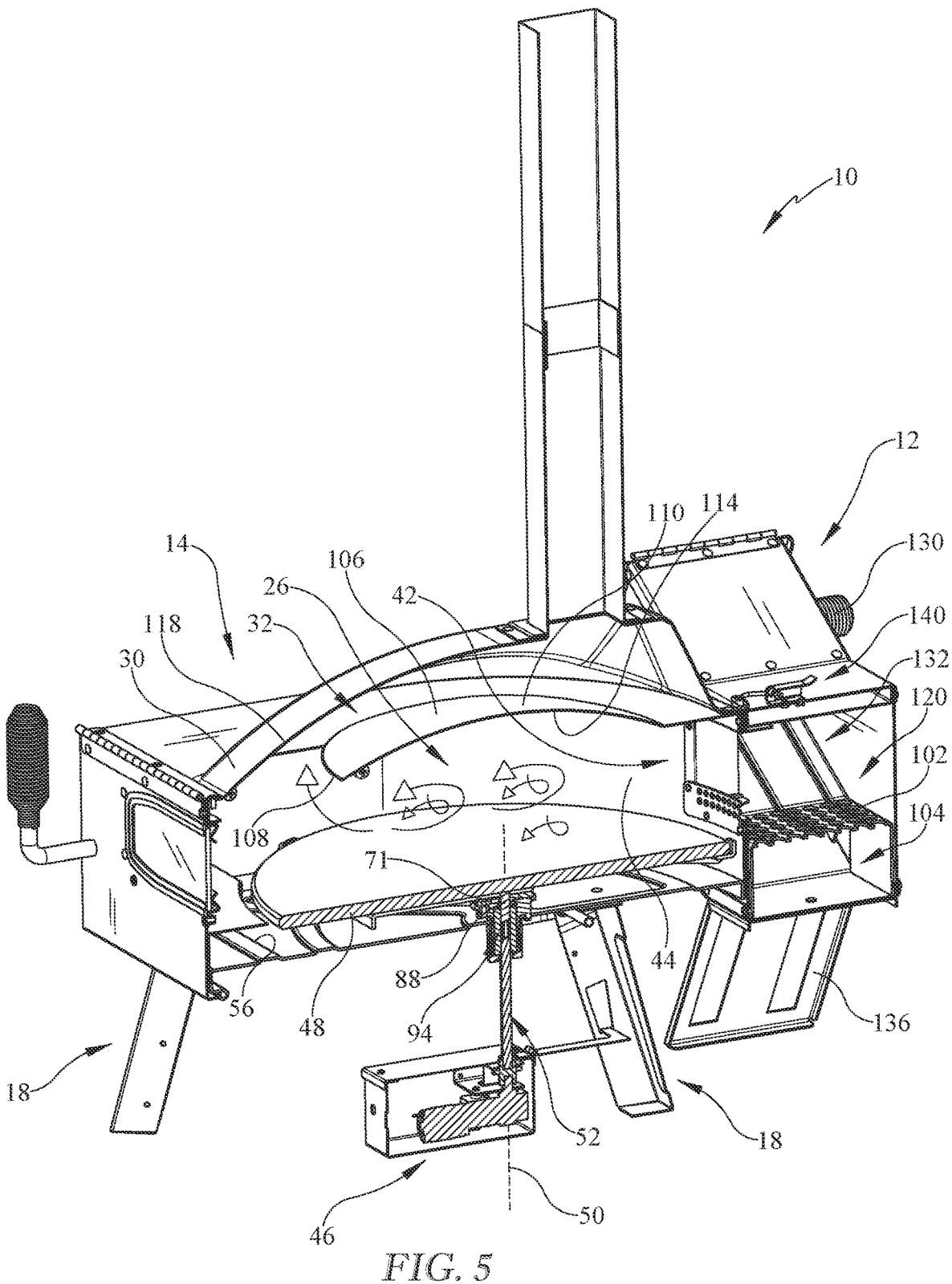
FIG. 5 is a perspective cross-sectional view of the oven of FIG. 1 with portions cut away to show the internal structure of the oven.

Access to the interior of the housing 16 is facilitated by a door 20 that is secured to the housing 16 by a hinge assembly 22 so that the door 20 is pivotable about an axis 24 to permit access to an interior space 26 shown in FIG. 5. The door 20 includes a window 21 comprising a high heat transparent ceramic. The housing 16 includes a top 28 that has a dome structure 30 and a channel 32 that is configured to provide a flow path for hot air to flow through the interior space 26 and exit the cook chamber 14 through a chimney 34. The door 20 supports a pair of handles 36 that include coiled grips 38 which are used to move the door about the axis 24 to provide access to the interior space 26. The handles 36 are pivotable between the position shown in FIG. 2 in which the coiled grips 38 are oriented vertically and a second position wherein the coiled grips 38 extend horizontally.

Figure 2:
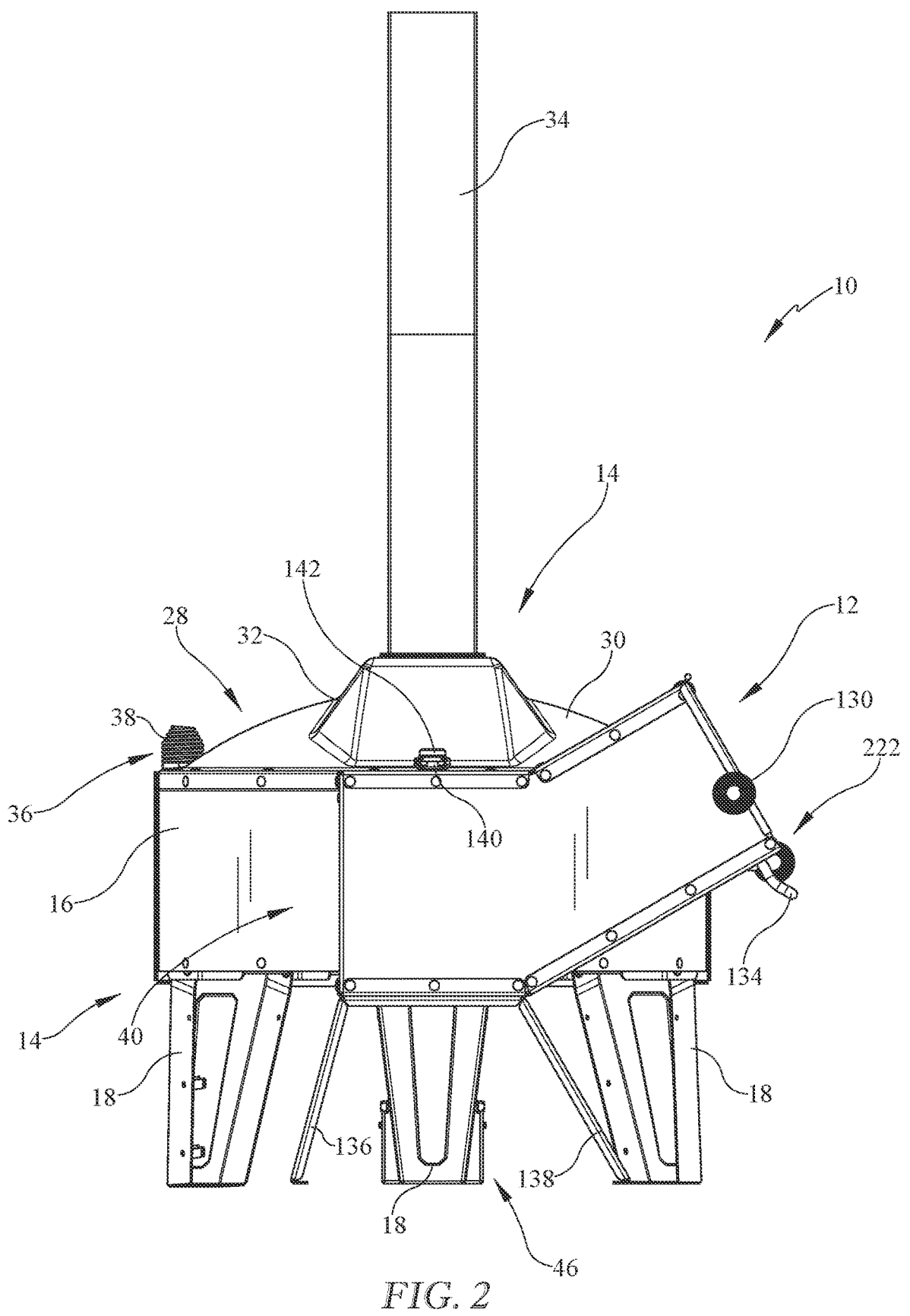
FIG. 2 is a back view of the oven of FIG. 1.
Figure 3:
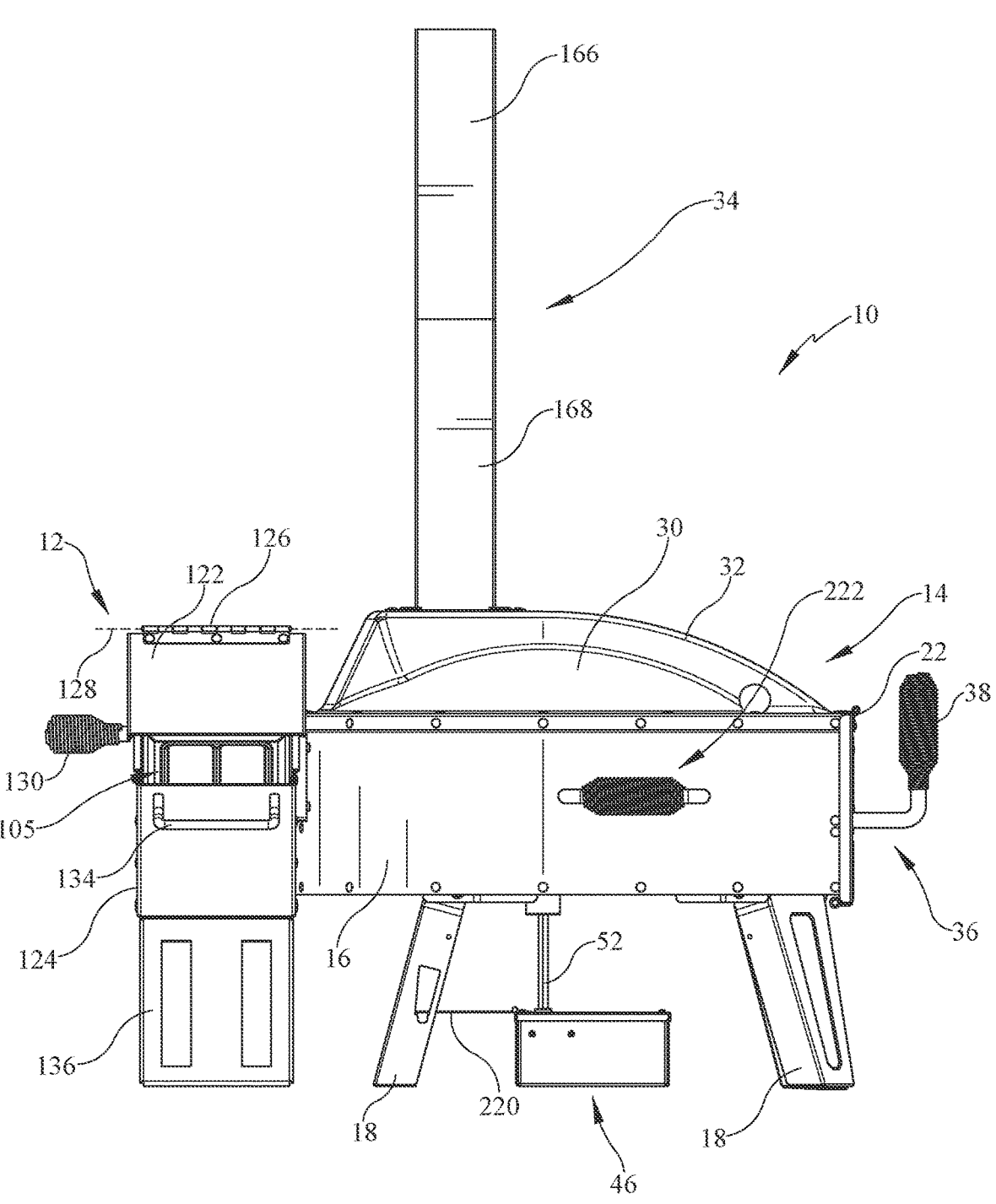
FIG. 3 is a side view of the oven of FIG. 1.

Referring to FIGS. 2-3, the firebox 12 is secured to the cook chamber 14 at the back 40 of the cook chamber 14 and is configured to provide a flow of hot air through an opening 42 in a back wall 44 of the of the cook chamber 14. The firebox 12 of the first embodiment is configured to receive solid fuel such as wood chips, charcoal, or the like which combusts and provide heated air. In another embodiment discussed in further detail below, the firebox 112 is configured to burn propane or natural gas.

Referring to FIG. 3, a motor assembly 46 is positioned below the cook chamber 14 and is operable to rotate a cook plate 48 seen in FIGS. 4 and 5, about an axis 50 within the interior space 26. The rotation of the cook plate 48 allows a foodstuff positioned on the cook plate 48 to be moved through the stream of hot air within the interior space 26 to improve the cooking of the foodstuff by varying the position of the foodstuff and thereby providing even heating of the foodstuff, even if there are temperature gradients within the interior space 26.

Figure 4:
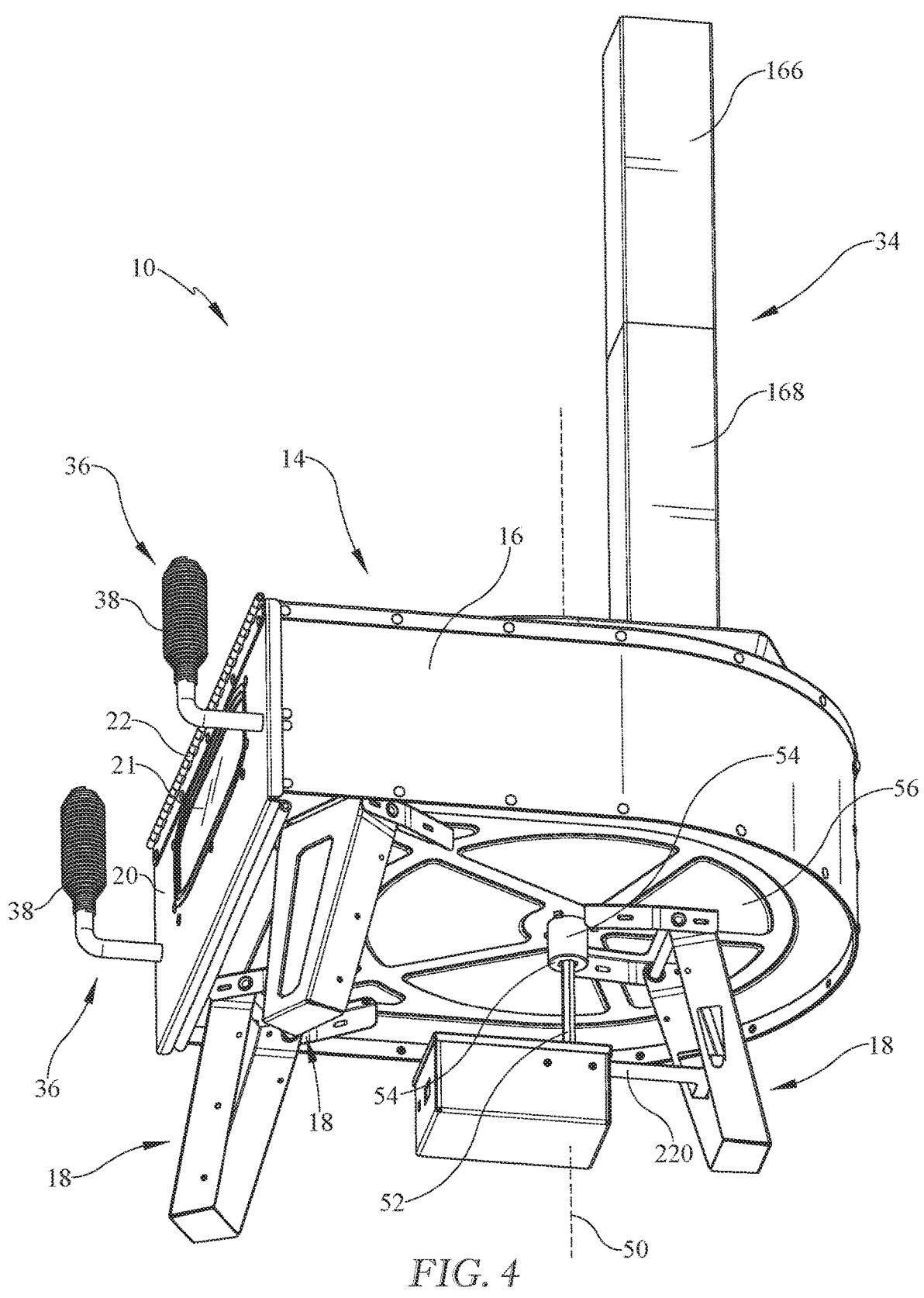
FIG. 4 is a perspective view of the oven of FIG. 1 with the firebox removed, the view in FIG. 4 taken below the right side of the oven of FIG. 1.
Figure 6:
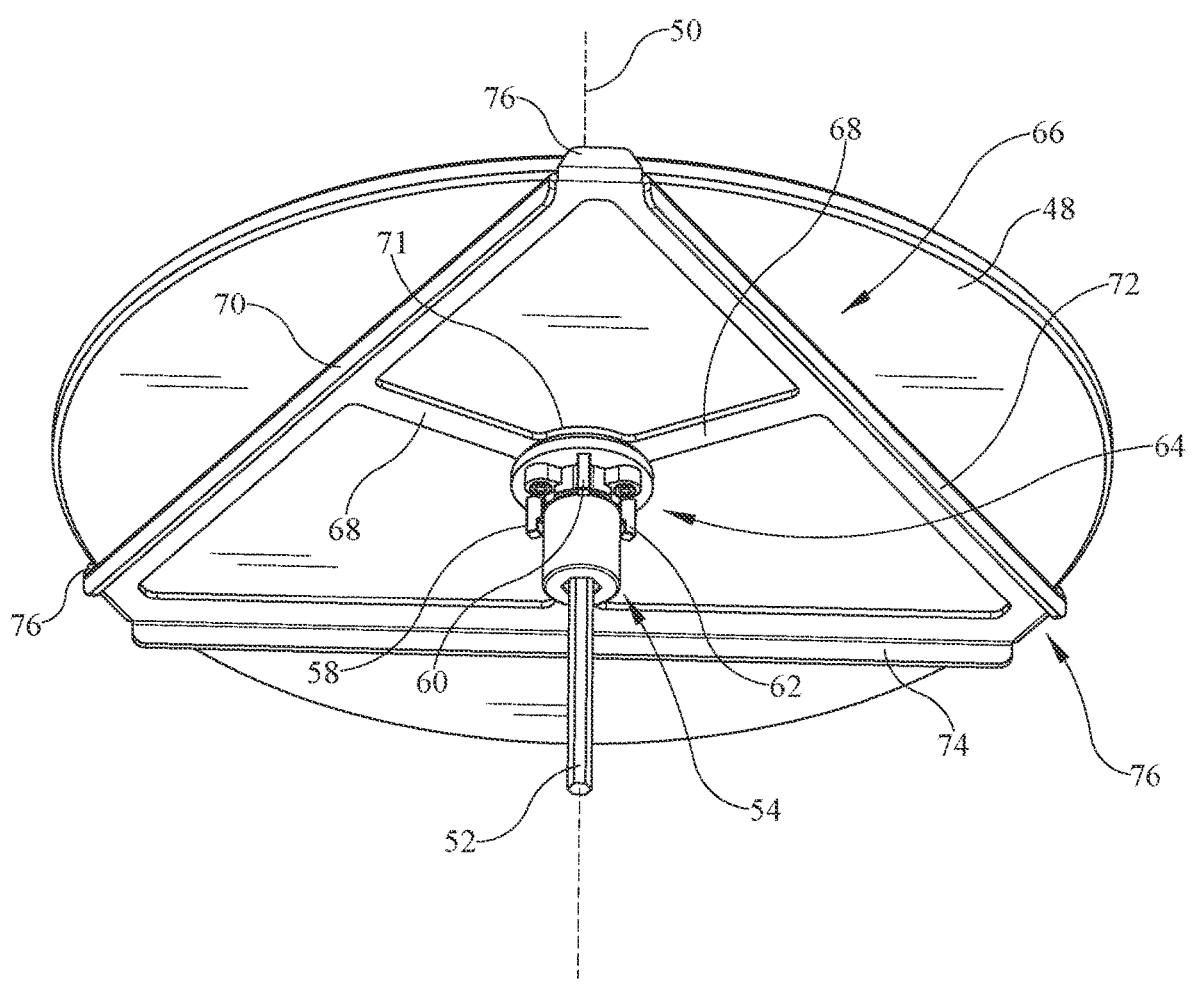
FIG. 6 is a perspective view of a rotating shaft, frame, and plate of the oven of FIG. 1 with other portions of the oven removed.

Referring now to FIG. 4, the motor assembly 46 rotates a shaft 52 that, in turn, acts on a coupler 54 that is secured to a bottom panel 56 of the cook chamber 14. As shown in FIG. 4, the bottom panel 56 is fixed and the coupler 54 is secured to the bottom panel 56 by three anti-rotation legs 58, 60, 62 of a collar 64 of the coupler 54. The legs 58, 60, and 62 protrude through matching holes formed in the bottom panel 56 and are held into place by the weight of the cook plate 48. Referring to FIG. 6, the cook plate 48 is supported on a rotating frame 66 that has three arms 68 that extend from a central hub 71. The arms 68 connect to frame members 70, 72, 74, which are interconnected to form a triangular structure with each frame member 70, 72, 74 connected to the adjacent other of the frame members 70, 72, 74. A lip 76 is formed at each of the connections between adjacent frame members 70, 72, 74 with the lips 76, 76, 76 configured to engage the edge of the circular cook plate 48 to limit movement of the cook plate 48 relative to the rotating frame 66.

Figure 7:
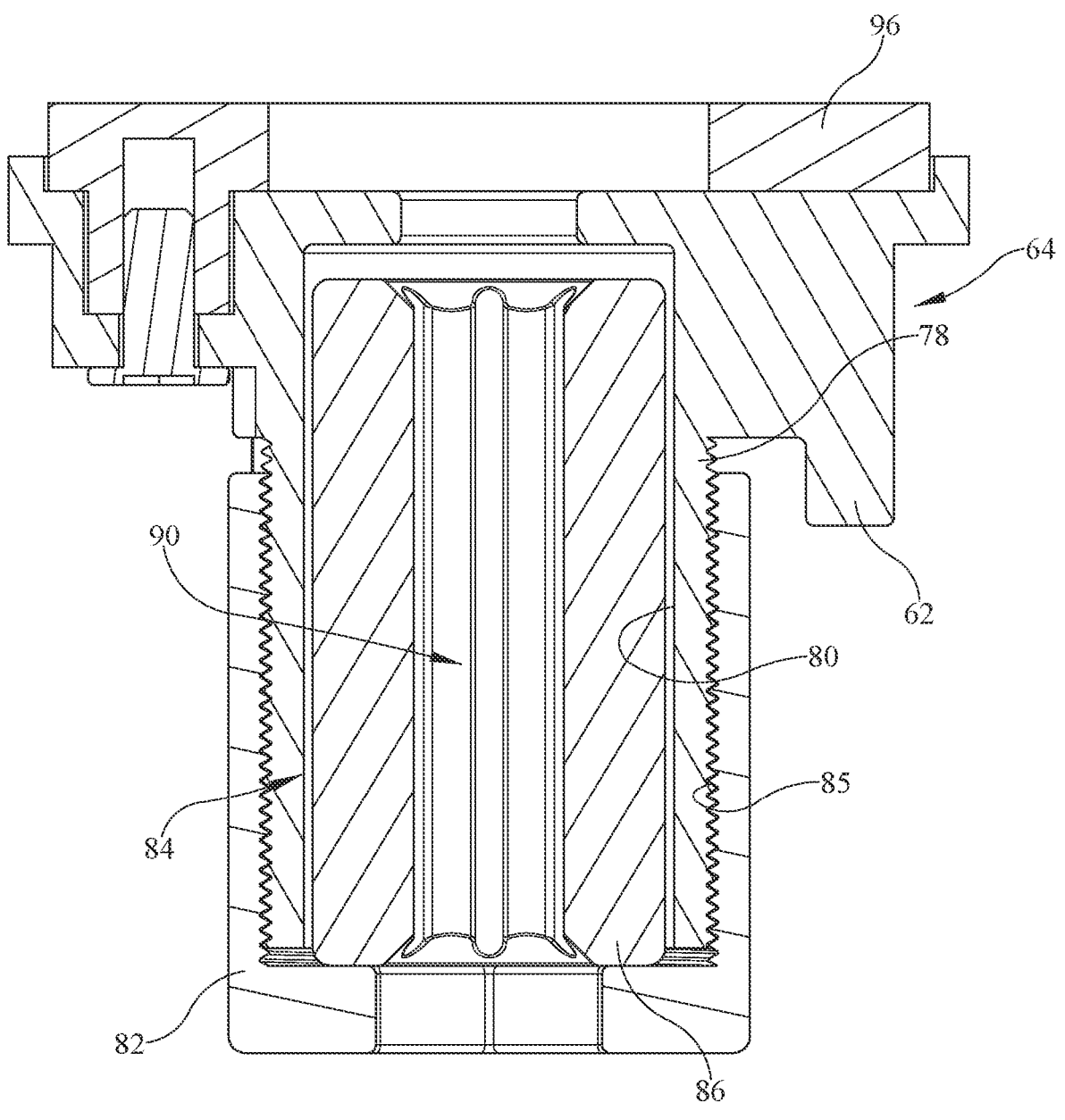
FIG. 7 is a cross-sectional view of a coupler shown in FIG. 6.
Figure 8:
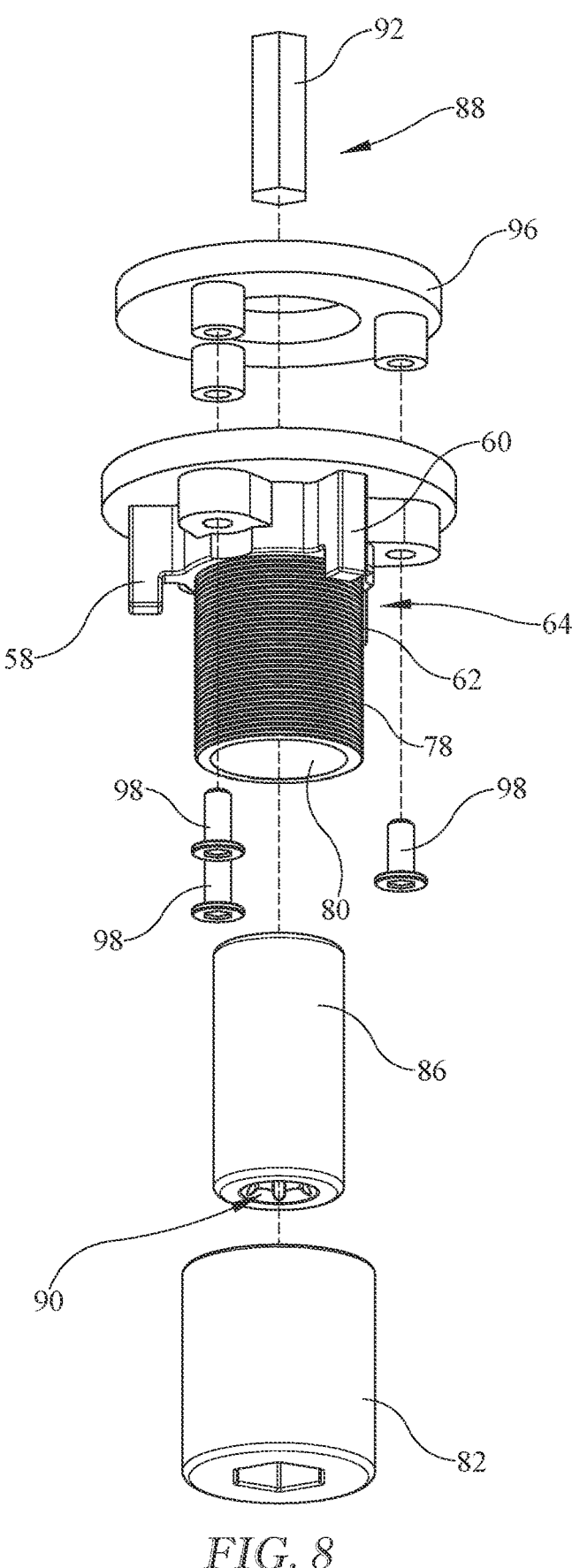
FIG. 8 is an exploded view of the coupler of FIG. 7.

The coupler 54 is shown in cross-section in FIG. 7 and in an exploded view in FIG. 8. The collar 64 includes a group of external threads 78 that extend vertically downwardly with an inner cylindrical wall 80. A threaded cup 82 includes internal threads 85 which are engageable with the threads 78 of the collar 64 so that the cup 82 may be threaded onto the collar 64 as shown in FIG. 7 to form an interior space 84. A thermally insulative ceramic connector 86 is positioned in the interior space 84 and is captured by the interaction of the cup 82 and the collar 64. Importantly, the connector 86 is free to move within the interior space 84 and is rotated by the shaft 52 so that as the shaft 52 rotates, the connector 86 rotates within the interior space 84. Notably, a hexagonal pin 88 is engaged with the connector 86 by insertion into a hexagonal channel 90 formed in the center of the connector. The upper end 92 of the pin 88 engages with the hub 71 of the rotating frame 66 so that rotation of the shaft 52 is transferred to the connector 86 which then rotates the pin 88 which thereby rotates the frame 66 and the cook plate 48. As shown in FIG. 5, the pin 88 is separated in the channel 90 from the shaft 52 by a gap 94 so that the heat from within the interior space 26 of the cook chamber 14 is impeded from being transferred between the pin 88 to the shaft 52. In addition, the length of the shaft 52 keeps the motor assembly 46 separated from the heat of the cook chamber 14 to reduce the heat transfer to the motor assembly 46. In effect, the thickness of the shaft 52 is small enough to allow the shaft 52 to transfer heat to the ambient air to help further reduce the potential for heat transfer to the motor assembly 46. The hub 71 of the frame 66 is supported on a pad 96 which is secured to the collar 64 by three screws 98, 98, 98. The pad 96 is a low friction thermally insulative ceramic material that supports the hub 71 during rotation, but limits heat transfer to the collar 64.

Referring again now to FIG. 5, the normal operation of the oven 10 will be described in detail. Solid fuel is positioned in a combustion chamber 100 and on top of a grate 102. When the fuel is ignited, a draft is created by air entering a channel 104 through an opening 105 (best seen in FIG. 3) in the firebox 12. The air is drawn though the channel 104 and up through the grate 102 to feed the combustion of the solid fuel.

The hot air and flames of combustion enter the interior space 26 through an open interface between the firebox 12 and the cook chamber 14. The hot air flows into the interior space and mixes within the interior space due to the shape of a deflector 106 positioned within the cook chamber 14 and supported below the dome structure 30 of the top 28 of the cook chamber 14 which, in effect, creates a double walled top, but also provides a flow path for heat to flow back over the interior space 26, on the other side of the deflector 106. Because of the intense heat of the burning solid fuel, a turbulent draft is developed between the opening 105 and the chimney 34. The turbulent draft of air flows around an end 108 of the deflector 106 and into the interior of the channel 32 such that the turbulent draft flows back across an upper surface 110 of the deflector 106 to limit the flow and transfer heat back to the deflector 106 so that the deflector becomes heated and thereby reduces the heat drawn from the turbulent air flow as it passes over the food stuff positioned on the cook plate 48.

Figure 9:
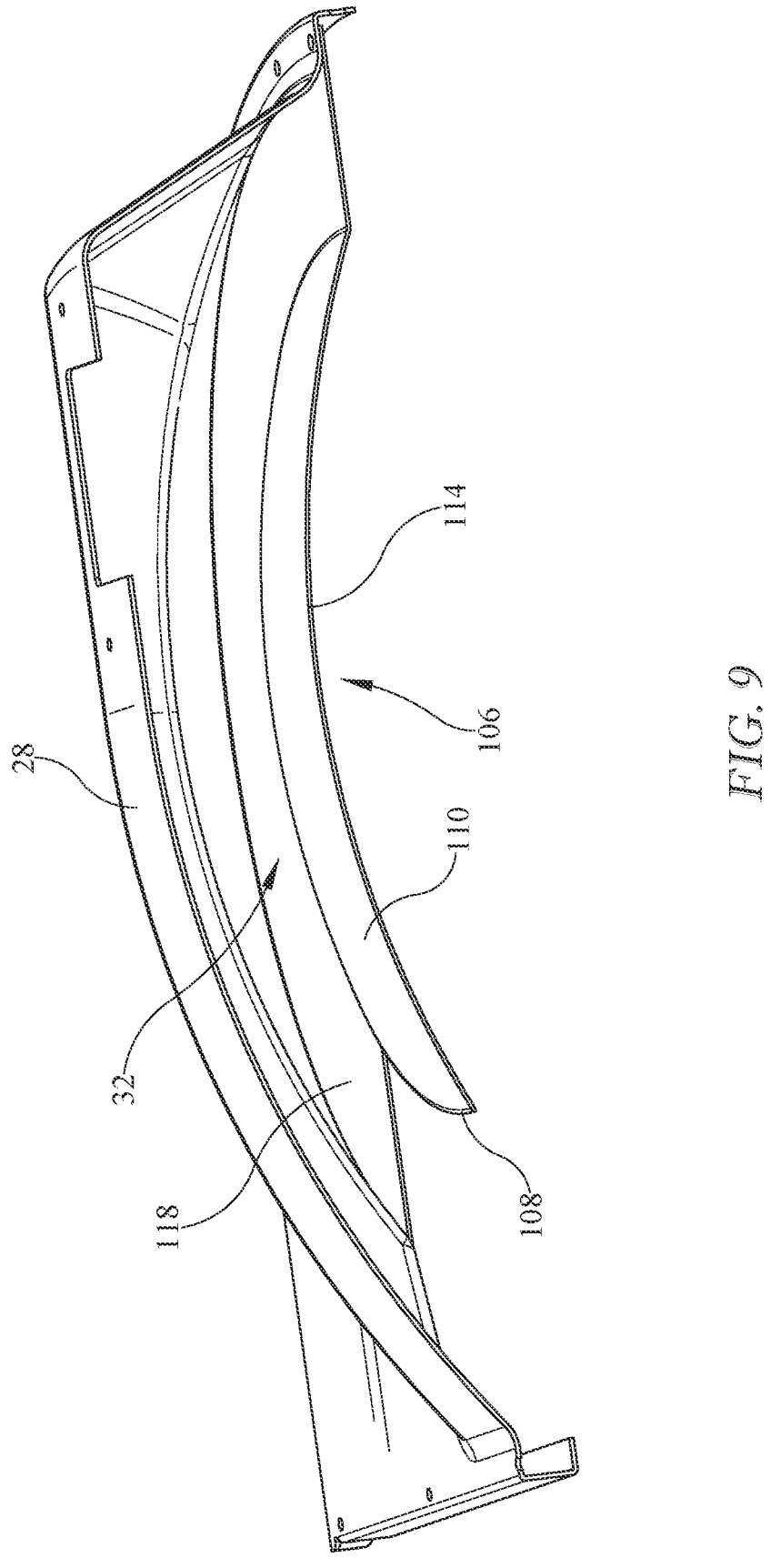
FIG. 9 is a perspective cross-sectional view of the double-walled top of the cook chamber of the oven of FIG. 1.
Figure 10:
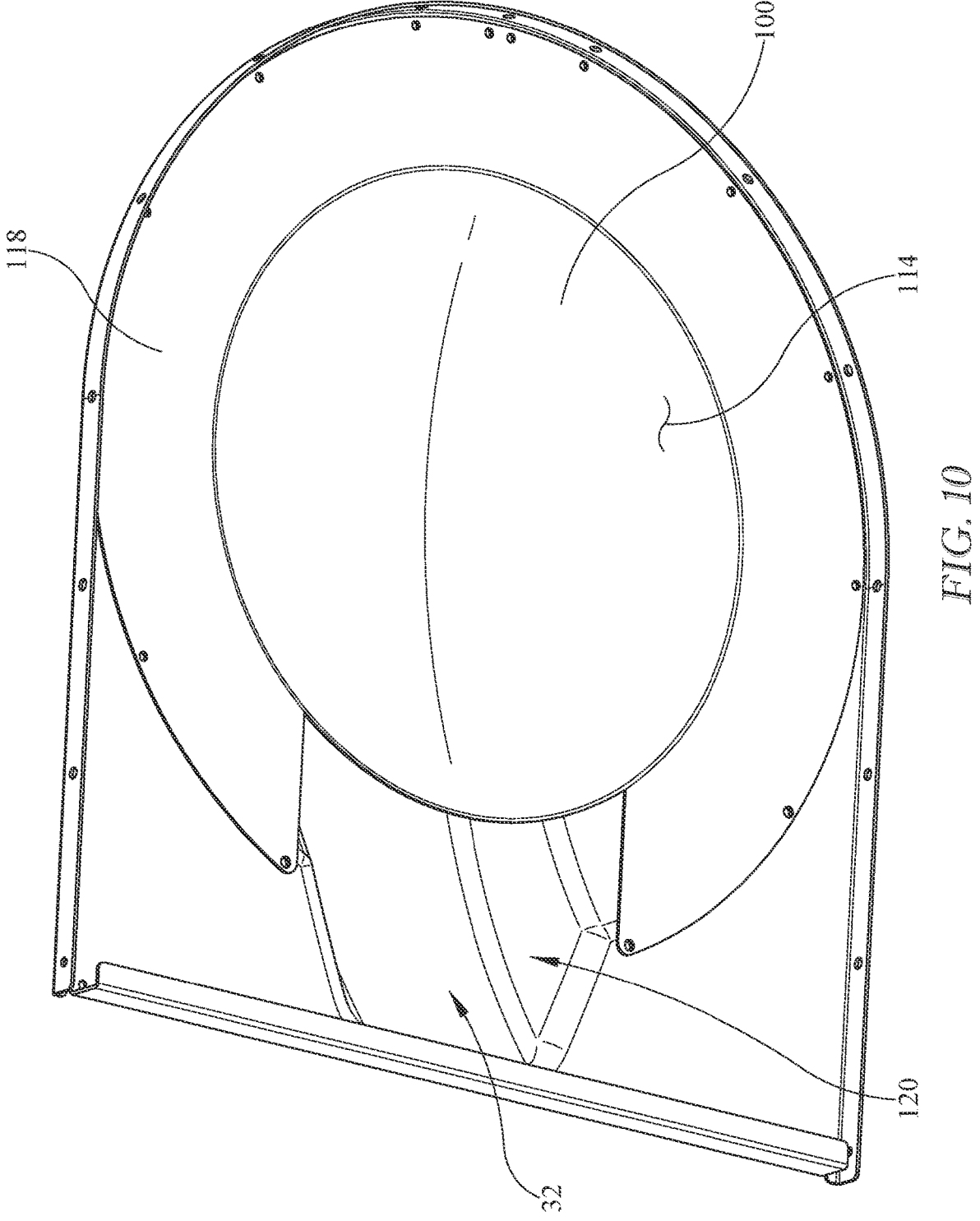
FIG. 10 is a perspective view of the double-walled top of FIG. 9 taken from below the top.

Referring now to FIGS. 9 and 10, the deflector 106 has a domed portion with a concave surface 114 facing the cook plate 48 and the convex surface 110 facing upwardly into the channel 32. However, the deflector 106 is supported on a boundary plate 118 that extends from the end 108 around the deflector 106 so that the boundary plate 118, top 28, and deflector 106 form an opening 120 through which the turbulent air enters the channel 32 to flow to the chimney 34. This fits with the overall design of the directed air flow of the oven 10 to provide maximum heating within the interior space 26 to cook the food stuffs supported on the cook plate 48.

Referring again to FIG. 3, the firebox 12 of the first embodiment includes a door 122 that is positioned on a frame 124 and connected by a hinge assembly 126 for rotation about an axis 128. A handle 130 is used to move the door to an open position to feed fuel into a chute 132 to feed the combustion chamber 100. Another handle 134 is positioned to allow the firebox 12 to be carried. Referring to FIGS. 1 and 2, the firebox 12 is supported on two fixed legs 136, 138 and is secured to the cook chamber 14 by a clasp mechanism 140 that engages a hook 142 on the cook chamber 14 and may be engaged to secure the firebox 12 to the cook chamber 14.

Figure 11:
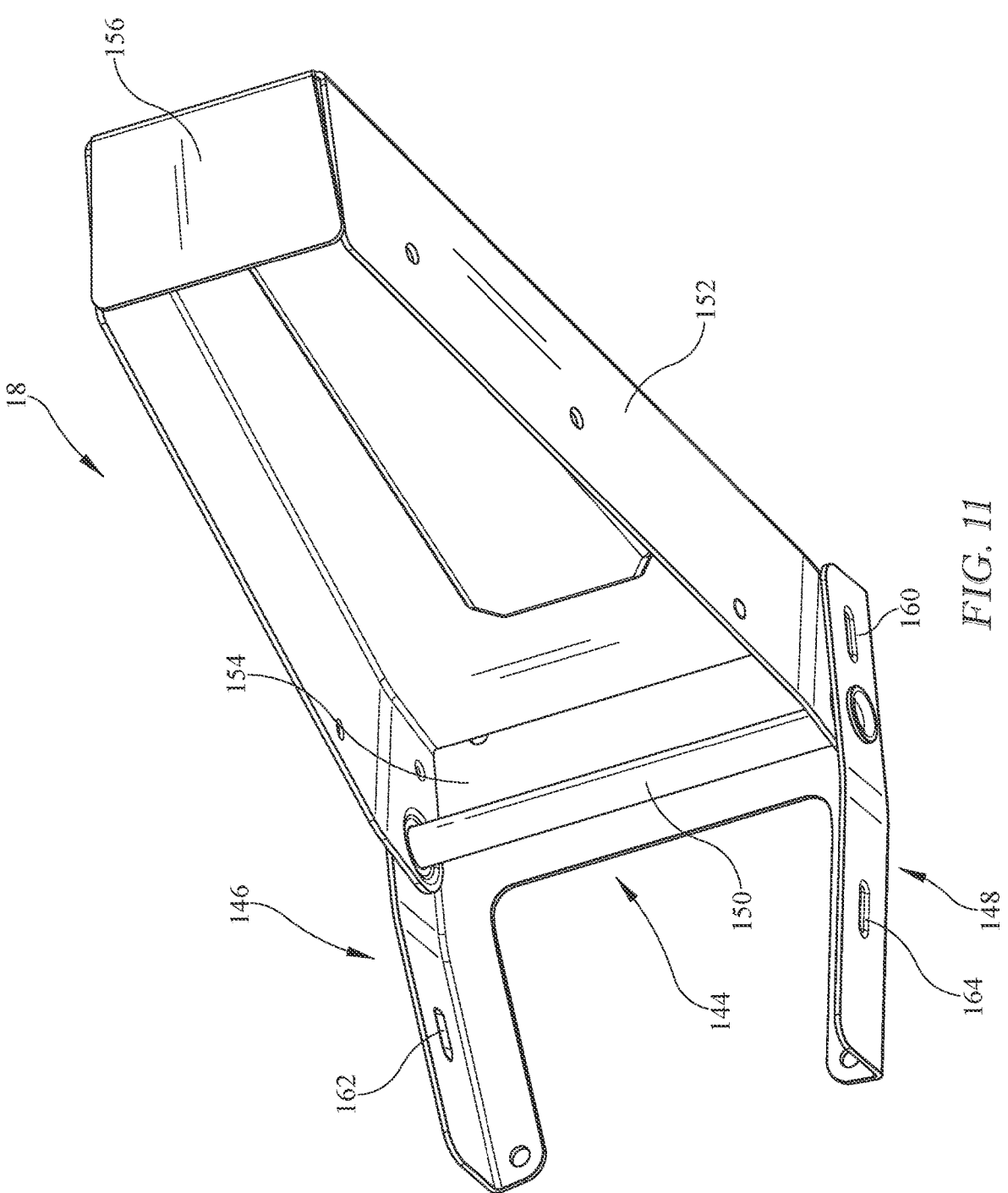
FIG. 11 is a perspective view of a collapsible leg assembly of the oven of FIG. 1.

Importantly, the oven 10 has several adaptations that make the oven 10 modular so that the oven 10 can be broken down and carried for easy transport. As noted above, the firebox 12 can be attached and detached from the cook chamber 14 by the clasp 140. This allows the firebox 12 to be separated from the cook chamber 14 for easy transport. Similarly, the collapsible legs 18 are movable to reduce the profile of the cook chamber 14 for transport. Referring to FIG. 11, the collapsible legs 18 include a base 144 that is secured to the bottom panel 56 (See FIG. 4). The base 144 includes to rails 146, 148 that support a pivot shaft 150. The collapsible legs 18 also include a support 152 that is pivotable about the shaft 150. The supports 152 are shaped so that when they are pivoted to a use position, as shown in FIG. 11, a stop 154 limits the movement of the support 152 about the shaft 150 but allows a foot 156 to an over-center position relative to the shaft 150 so that when the three collapsible legs 18 are opened or extended, the weight of the cook chamber 14 acts on the supports 152 to cause the weight to be supported through stops 154. The over-center condition tends to provide improved stability. Still further, the rails 146 and 148 have first detents 158 and 160, respectively, that create interference with the support 152 to tend to frictionally lock the supports 152 in the use position. In other words, if the weight is removed from one or more of the supports 152, the detents 158 and 160 will tend to keep them in the use position until they are re-loaded with weight. Similarly, the rails 146 and 148 converge at the end opposite the detents 158 and 160 so that the support 152 nests into the rails 146, 148 when the support 152 is rotated about the shaft 150 to a lie adjacent the bottom panel 56. A pair of detents 162 and 164 are formed in the rails 146 and 148 respectively and act similarly to the detents 158 and 160 to keep the support 152 in a stowed position (not shown) when the support 152 is engaged with the rails 146, 148. The detents 162, 164 cause an interference engagement with the support 152 to retain the support 152 in a stowed position.

Figure 12:
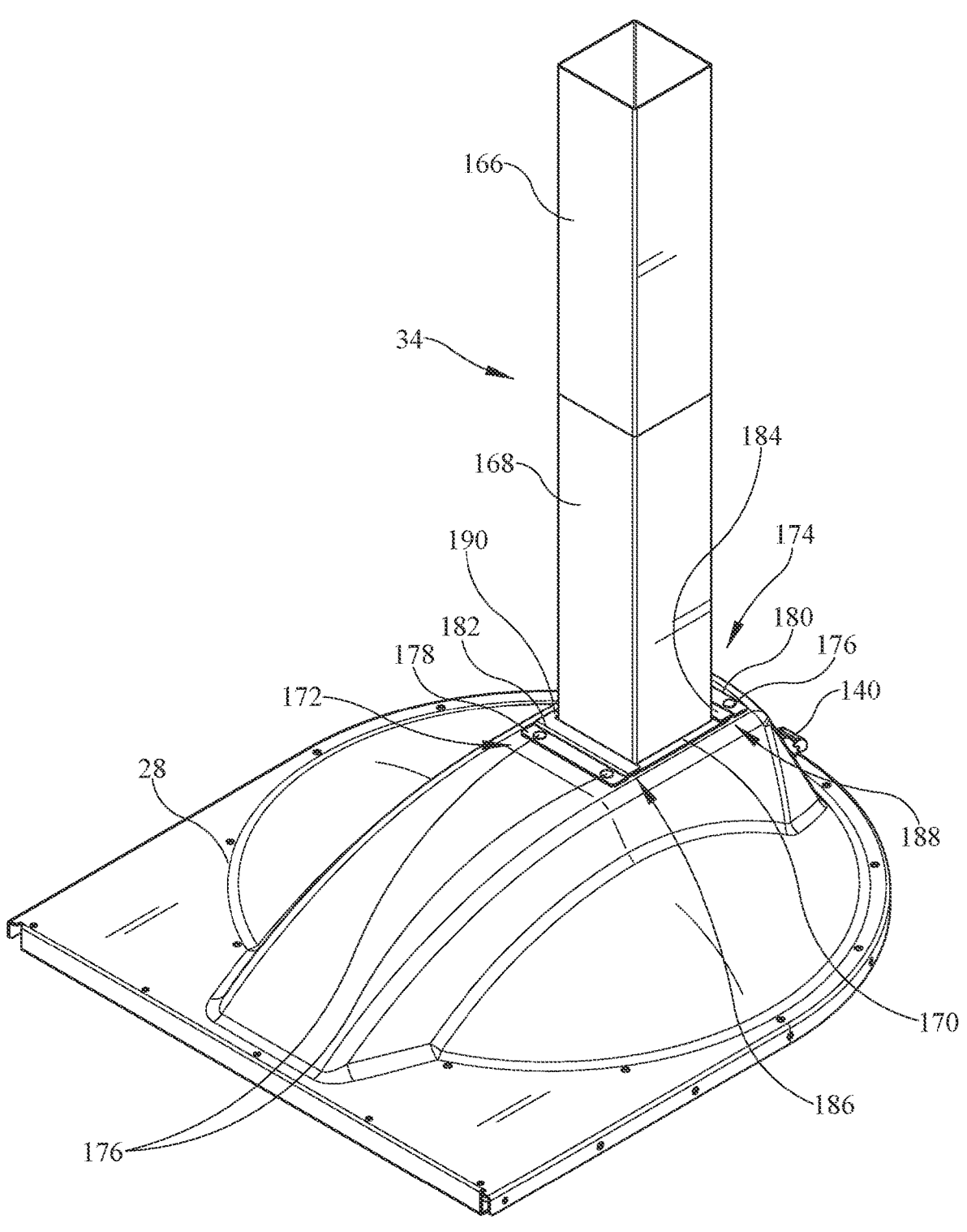
FIG. 12 is a perspective view of the chimney of the oven of FIG. 1 mounted to the top of the oven.

Referring now to FIG. 12, the chimney 34 is also easily removable and collapsible. The chimney 34 includes an upper portion 166 which is tapered and received in a lower portion 168. Because of the taper of the upper portion 166 it simply sits on the lower portion 168 and is held in place by gravity. The lower portion 168 is formed to include a flange 170. A pair of retainers 172, 174 are each secured to the top 28 of the cook chamber 14 by a pair screws 176, 176. The retainers 172, 174 include a respective base 178, 180 and an offset flap 182, 184. When the retainers 172, 174 are secured to the top 28, the offset flaps 182, 184 create respective channels 186, 188 into which the flange 170 may be slid to secure the lower portion 168 to the top 28 by the retainers 172, 174. This allows the lower portion 168 of the chimney 34 to be retained on the top 28 without any fastening. Each retainer 172, 174 includes a hook 190, 192 that provides a positive stop to locate the chimney 34 relative to the top 28 when the chimney 34 is assembled to the cook chamber 14. Because the upper portion 166 can be separated from the lower portion 168 and the lower portion

168 can be separated from the cook chamber 14, the chimney 34 is easily removed and transported.

Figure 13:
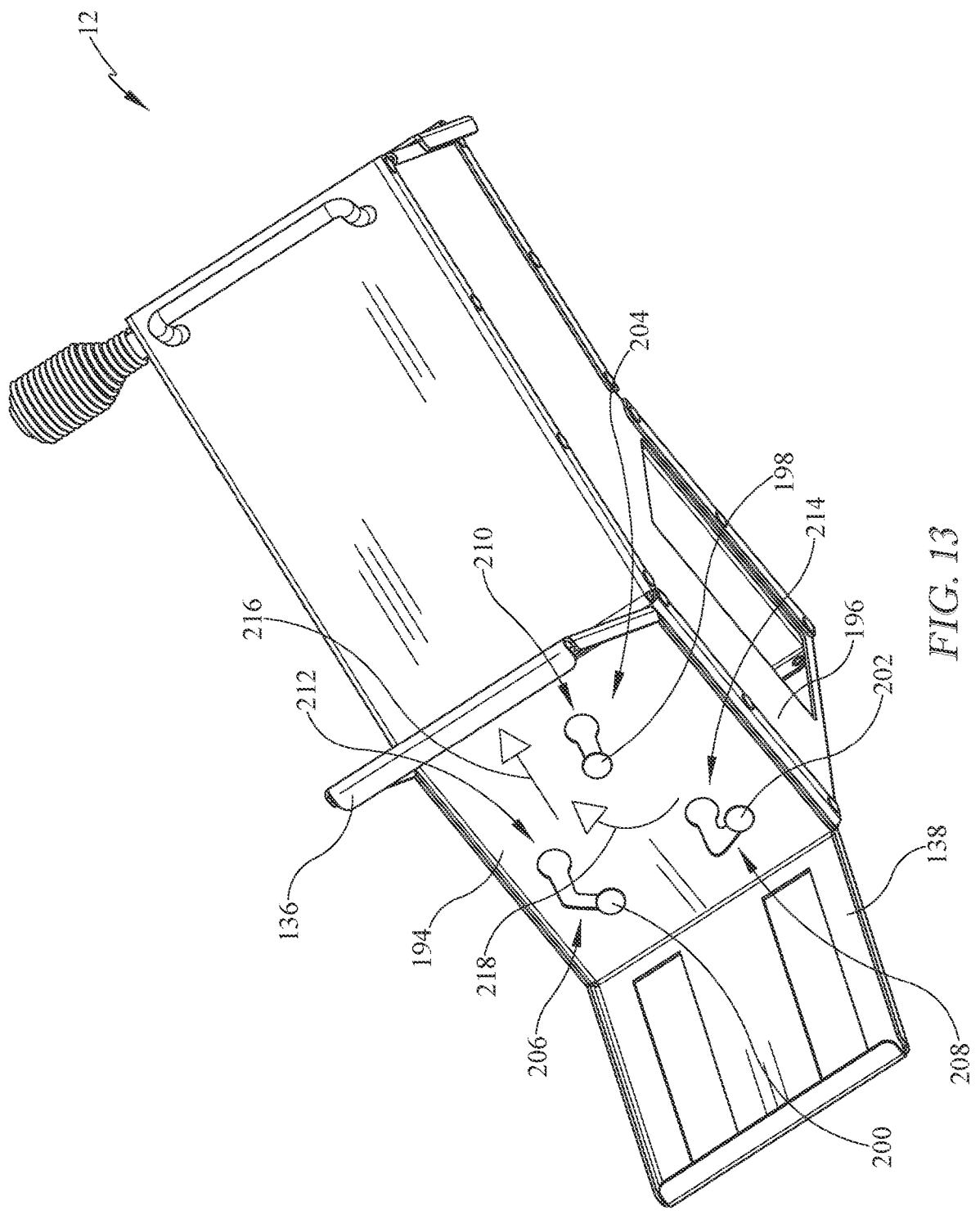
FIG. 13 is a perspective view taken from below the firebox of the oven of FIG. 1.

The firebox 12 is also somewhat modular and capable of being broken down for transportation. Referring to FIG. 13, it can be seen that the fixed legs 136, 138 are secured to a base 194 that is removable attached to a housing 196 of the firebox 12. There are three screws 198, 200, and 202 that are positioned on the bottom of the housing 196. The base 194 is formed to include three key-hole style slots 204, 206, and 208. The key-hole style slots 204, 206, 208 are each uniquely shaped so that the large circular sections 210, 212, and 214 can be simultaneously placed over the screws 198, 200, 202. The base is then moved in the direction of an arrow 216 to move the first screw 198 to a secured position as shown in FIG. 13. Once that motion is complete, the base is rotated about the screw 198 in the direction of arrow 218 to move the screws 200 and 202 to their respective secured positions as shown in FIG. 13. This compound movement reduces the potential for the base 194 and, thereby, the legs 136, 138, from being unexpectedly removed from the housing 196. However, no tool are required to assemble the base 194 to the housing 196. To disassemble, the steps described above are simply reversed. In this way, the firebox 12 can be broken down for transport.

The motor assembly 46 is also removable relative to the cook chamber 14. As shown in FIGS. 3 and 4, the motor assembly includes a stowable hook 220 that engages with a support 152 of a collapsible leg 18 to locate the motor assembly 46 relative to the cook chamber 14. The shaft 52 is removable from the coupler 54 and the motor assembly 46 without tool as the shaft is movable relative to both, but is keyed to transfer the rotation from the motor assembly 46 to the coupler 54 and, thereby, the cook plate 48. The motor assembly 46 includes a DC motor which is operated by a rechargeable battery. As such, there is no AC power requirement which allows the oven 10 to be completely portable.

To disassemble the oven 10, a user would first remove the firebox 12 from the cook chamber 14 by releasing the clasp mechanism 140. Then the user would remove the legs 136, 138 by releasing the base 194 from the housing 196 of the firebox 12. Using the handle 134 to carry the remainder of the firebox 12 and carrying the legs 13, 138 separately, the entire firebox 12 can be transported or stored easily. Similarly, the collapsible legs 18 of the cook chamber 14 would be moved to a stowed position, the upper portion 166 of the chimney 34 would be separated from the lower portion 168 and the lower portion 168 would be separated from the top 28 of the cook chamber 14. The chimney components would be transported separately and the cook chamber 14 can be carried suitcase style using a handle 222 positioned on a side of the cook chamber 14. The motor assembly 46 and shaft 52 would be separated from the cook chamber 14 and also carried separately. In some embodiments, the chimney components, motor assembly 46, and shaft 52 may be positioned in the interior space 26 of the cook chamber 14 for transport.

Figure 14:
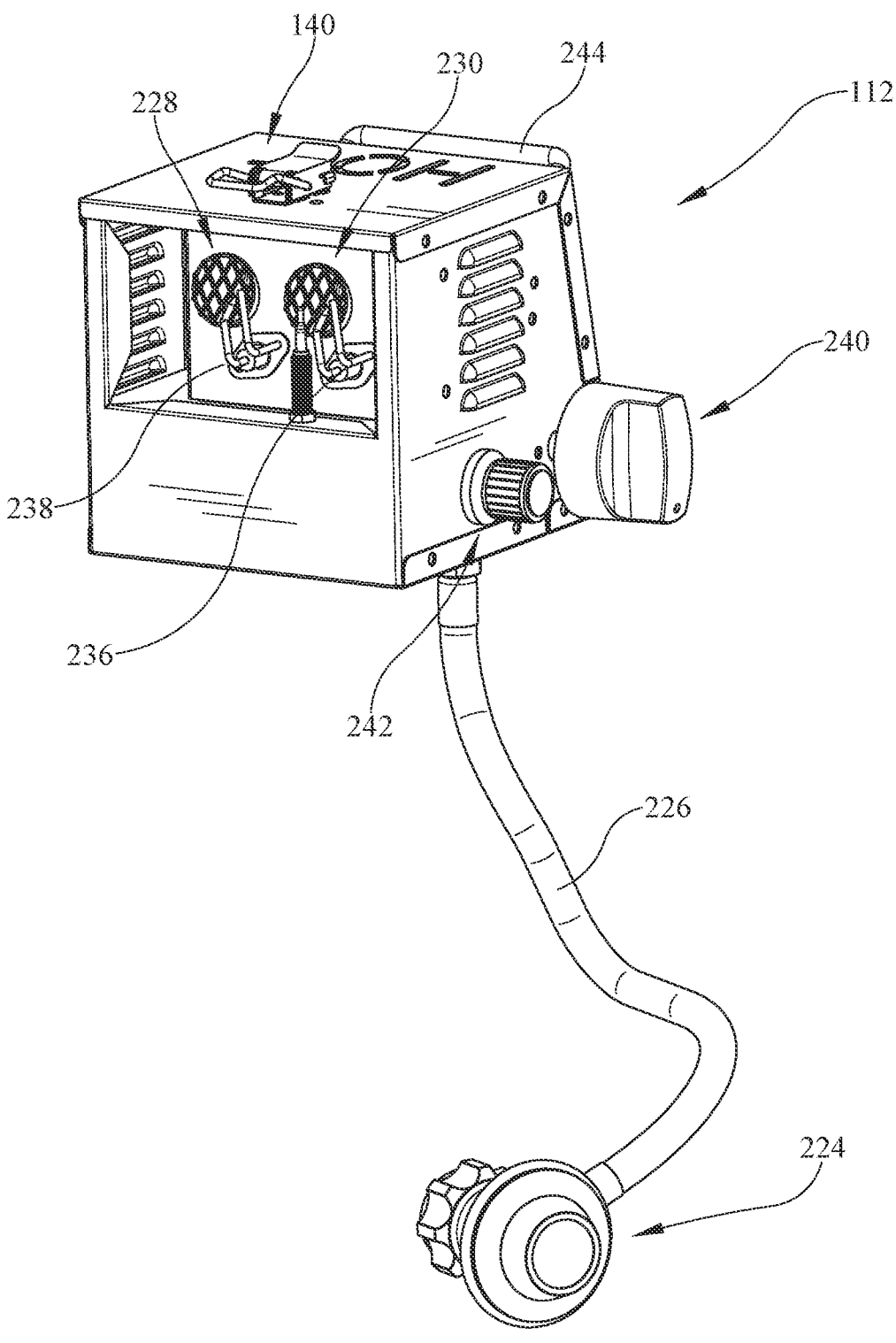
FIG. 14 is a perspective view of an alternative embodiment of a firebox for the oven of FIG. 1, the firebox of FIG. 14 being propane powered.
Figure 15:
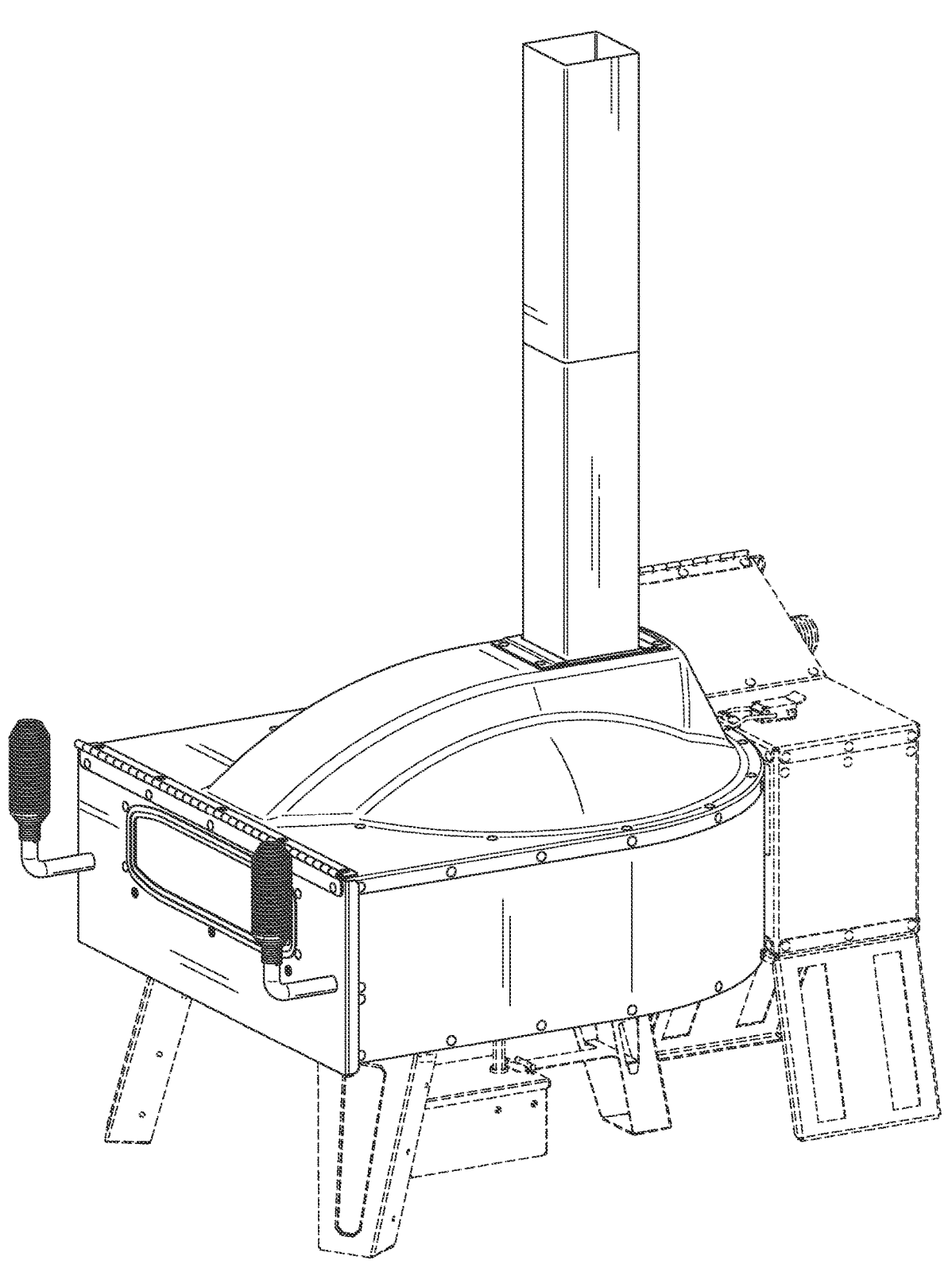
FIG. 15 is a upper front perspective view of an oven in accordance with the present disclosure.
Figure 16:
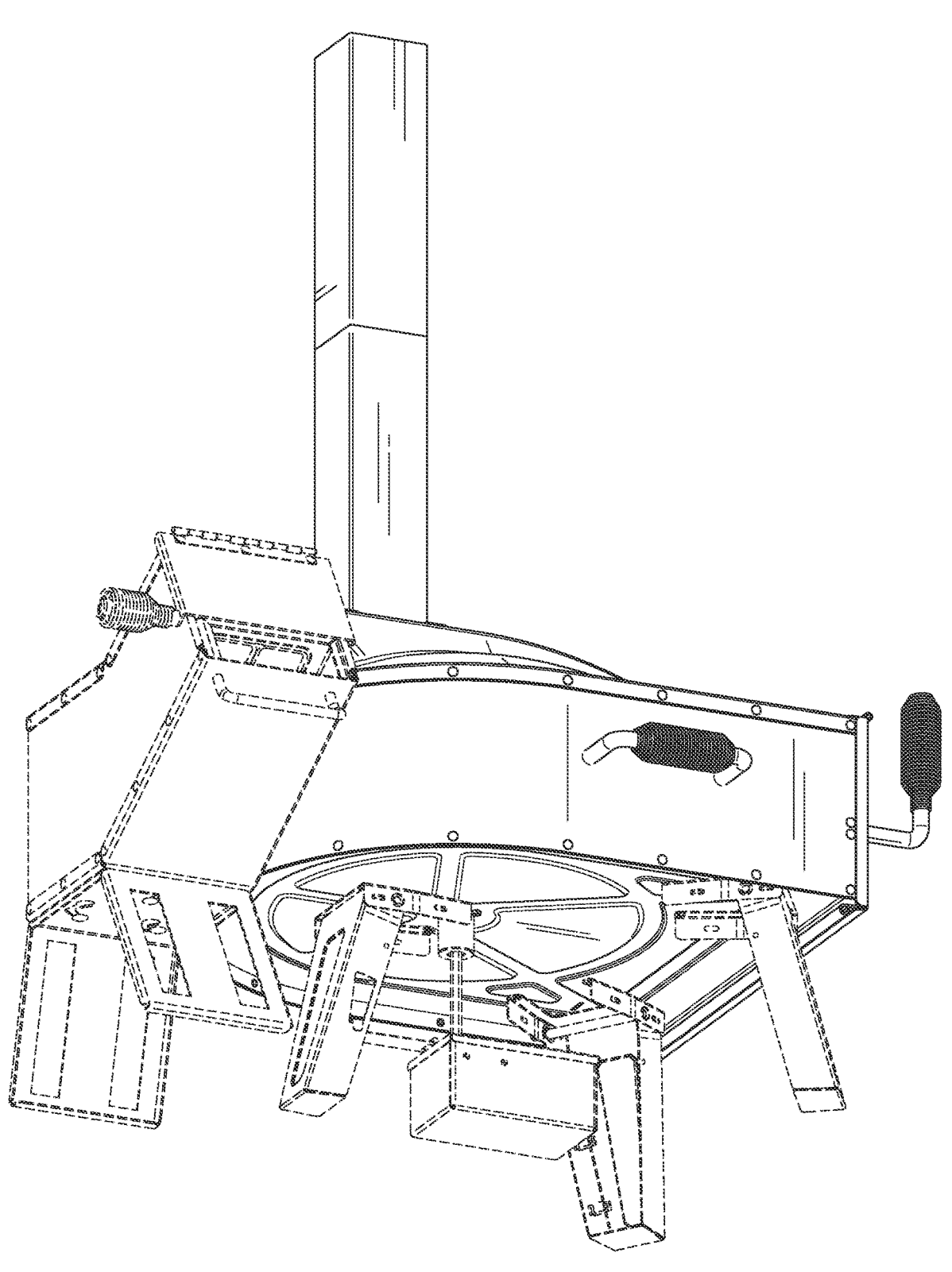
FIG. 16 is a lower back perspective view thereof.
Figure 17:
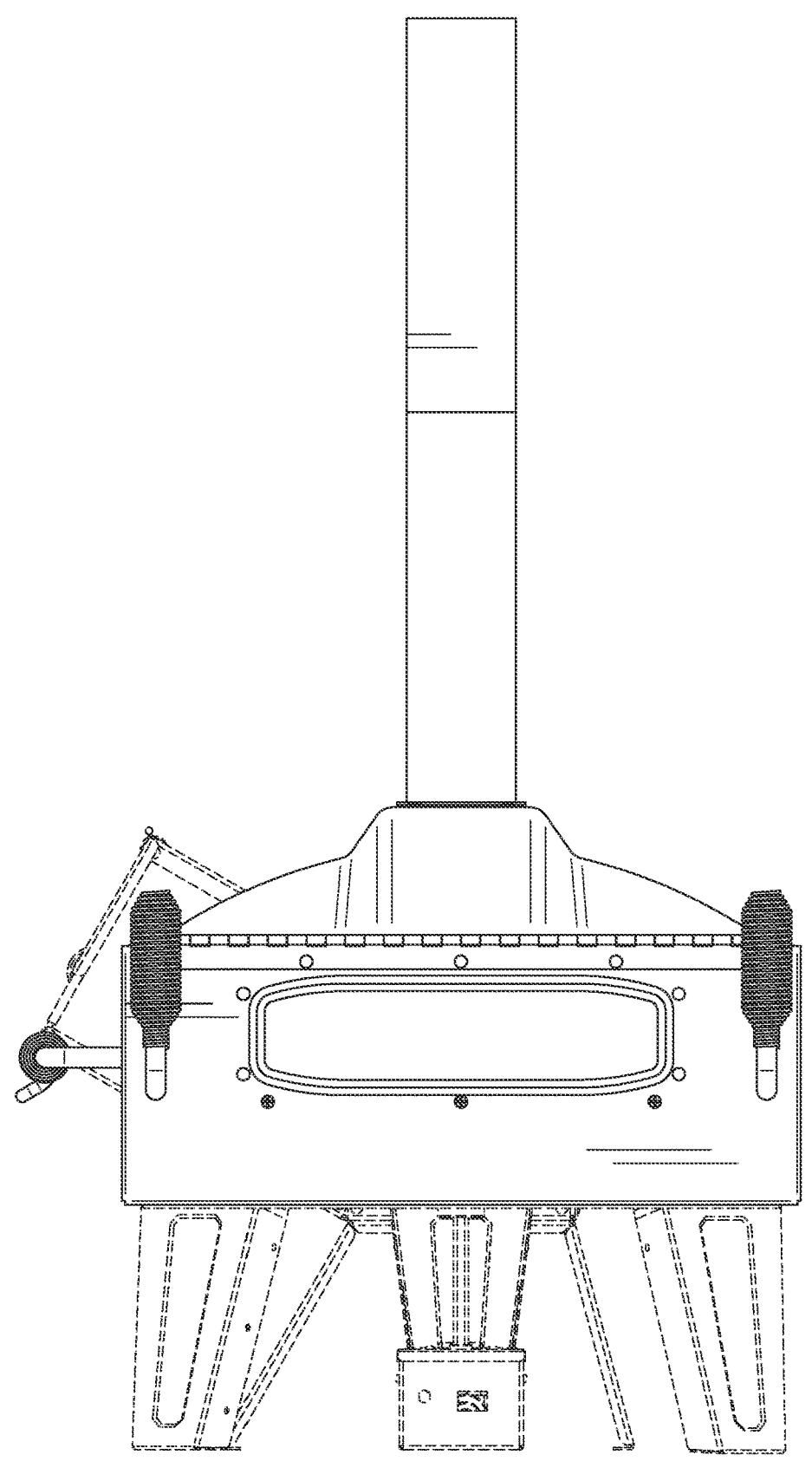
FIG. 17 is a front elevation view thereof.
Figure 18:
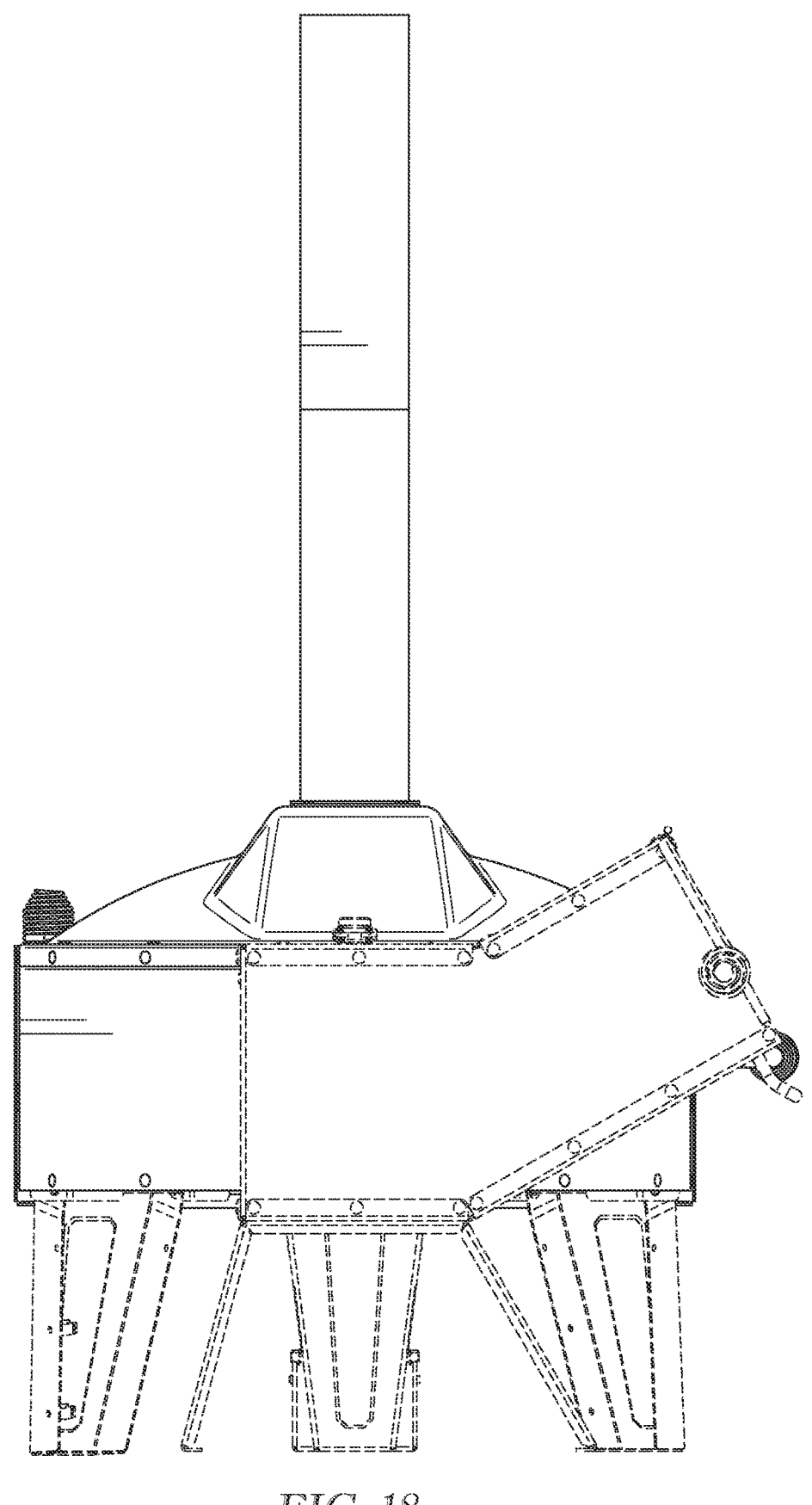
FIG. 18 is a back elevation view thereof.
Figure 19:
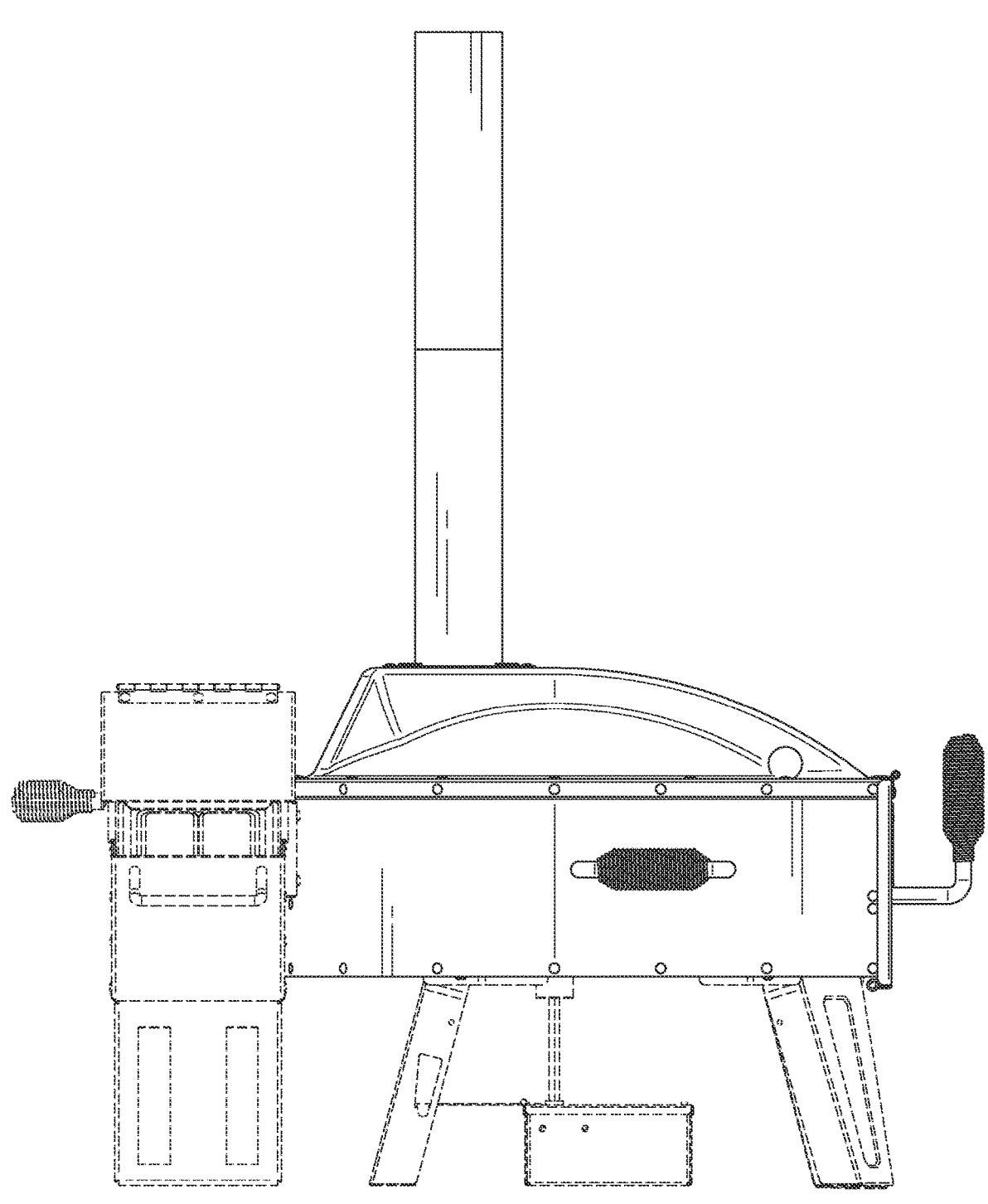
FIG. 19 is a left side elevation view thereof.
Figure 20:
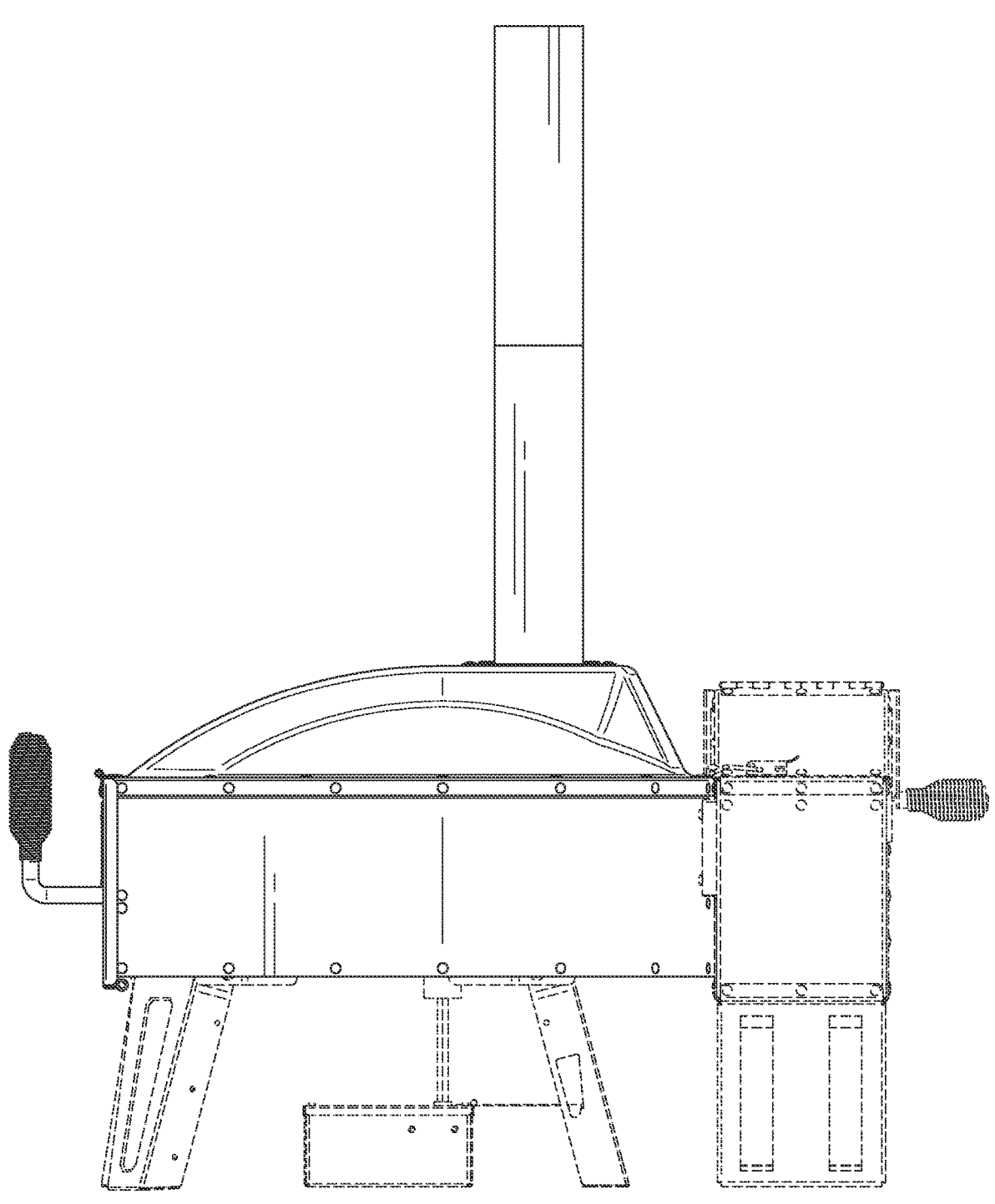
FIG. 20 is a right side elevation view thereof.
Figure 21:
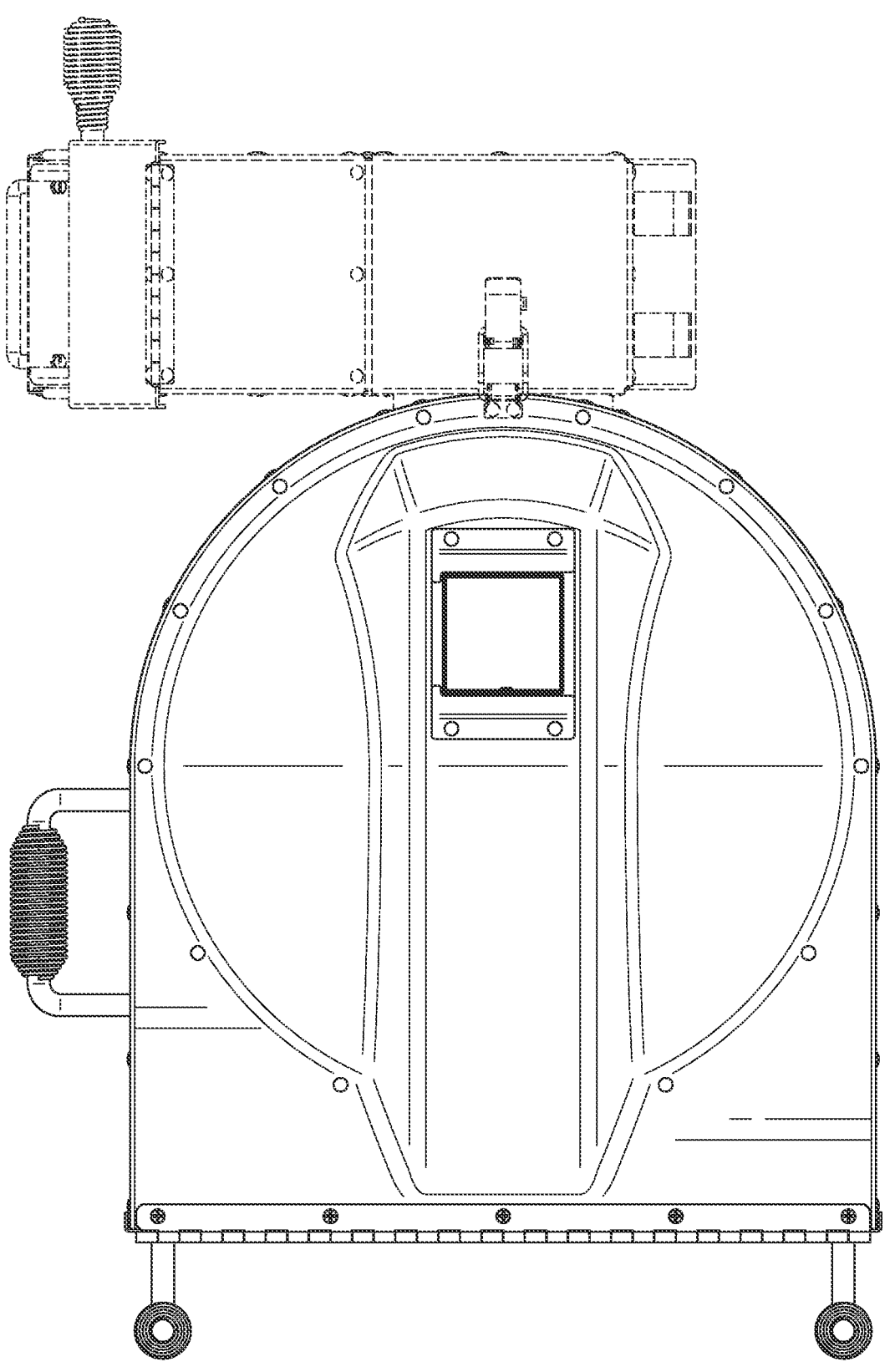
FIG. 21 is a top plan view thereof.
Figure 22:
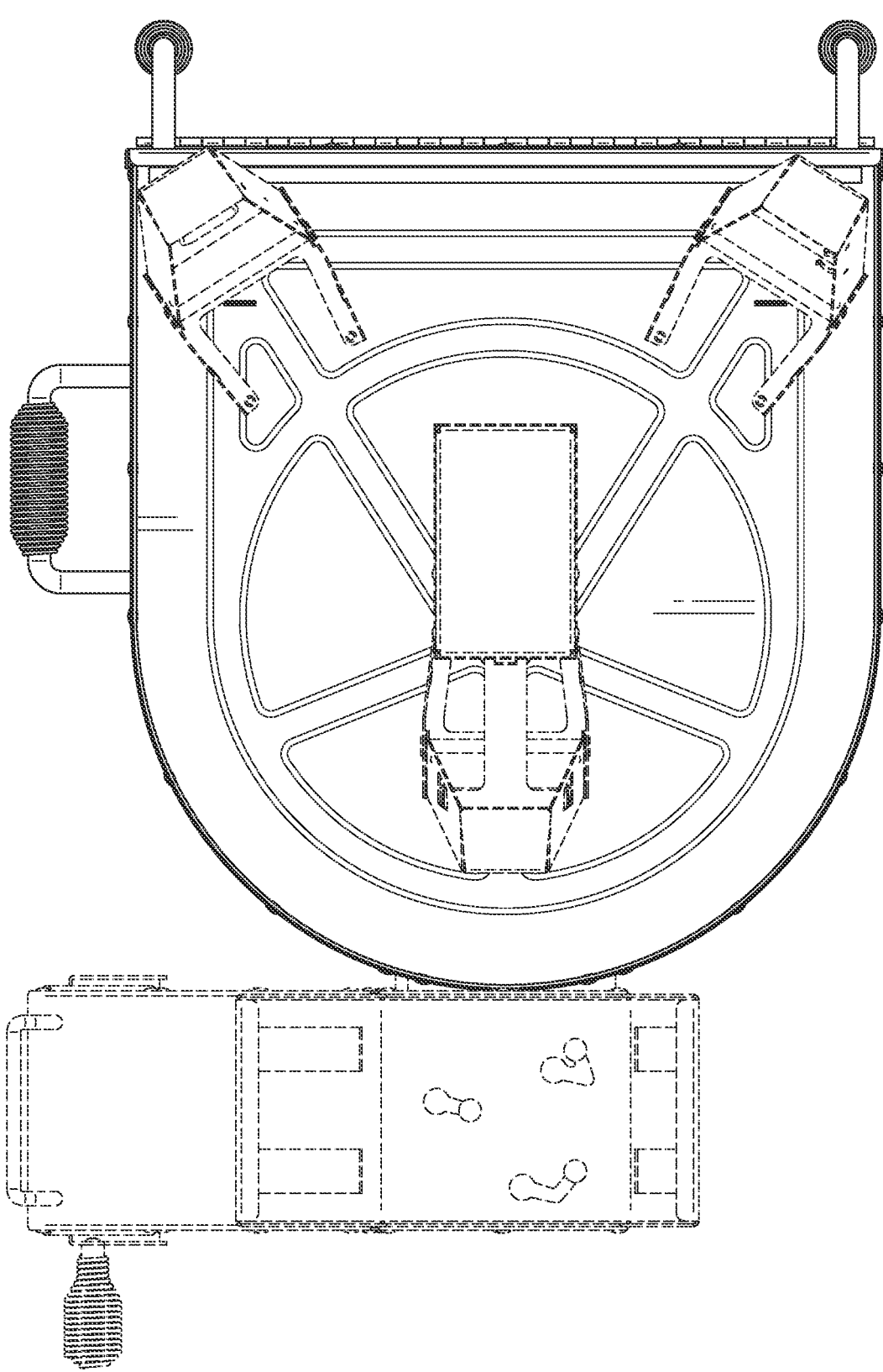
FIG. 22 is a bottom plan view thereof.

Referring now to FIG. 14, a propane burner firebox 112 is shown which is configured to replace firebox 12. The firebox 112 is configured to engage with the cook chamber 14 by hanging from the hook 142 with a clasp mechanism 140 securing the firebox 112 in position. The firebox 112 includes a regulator assembly 224 that operates as is known in the art to engage a propane cylinder (not shown) and feed propane through a hose assembly 226. The hose assembly 226 feeds a manifold (not shown) which feeds two propane jet burners 228, 230. The firebox 112 includes an ignitor assembly 232 with ignitor probes 234, 236 positioned adjacent respective burners 228, 230. In use, the jet burners 228, 230 cause flames to extend into the interior space 26 to provide high heat. The flow gas to the burners 228, 230 is controlled by a knob 240 which operates a valve (not shown) as is known in the art. The ignitor probes 234, 236 are manually activated by a switch 242 as is also known in the art. In the illustrative embodiment, a temperature probe 246 is present. It is contemplated that the temperature probe may monitor the temperature in the firebox 112 and cut the flow of gas to the burners 228, 230 if the temperature exceeds a safe level.

The firebox 112 is also mobile with the simple attachment using the clasp mechanism 140 and includes handle 244 which may be used to transport the firebox 112, similar to firebox 12.

Although this disclosure refers to specific embodiments, it will be understood by those skilled in the art that various changes in form and detail may be made without departing from the subject matter set forth in the accompanying claims.

What is claimed is:

1. A portable, high temperature oven comprising,
a cook chamber defining an interior space, the cook chamber including a housing, a rotatable cook plate positioned in the interior space, a rotatable frame supporting the cook plate, the rotatable frame movable relative to the housing, the housing defining a concave upper surface bounding the interior space, the concave upper surface positioned to overlie the rotatable cook plate, and a channel positioned above the concave upper surface, the channel configured to direct a flow of hot air from below the concave upper surface back over the concave upper surface,
a chimney through which the hot air traverses after exiting the cook chamber,
a motor assembly positioned below the cook chamber,
a drive shaft extending between the motor assembly and a thermally insulative coupler,
a pin extending between the coupler and the rotatable frame such that rotation of the motor is transferred through the shaft, to the coupler, to the pin, and to the rotatable frame to rotate the cook plate, and
a firebox removably coupleable to the cook chamber and configured to inject a flame into the interior space of the cook chamber between the cook plate and the concave upper surface.

2. The portable, high temperature oven of claim 1, wherein the firebox is a solid fuel firebox including a combustion chamber and an air channel that is operable to direct ambient air through the combustion chamber, the firebox configured to cause a flame to be extended into the interior space.

3. The portable, high temperature oven of claim 2, wherein the cook chamber includes collapsible legs.

4. The portable, high temperature oven of claim 2, wherein the firebox includes removable legs.

5. The portable, high temperature oven of claim 2, wherein the firebox includes a door providing access to a chute for feeding solid fuel to the combustion chamber.

6. The portable, high temperature oven of claim 2, wherein the combustion chamber has a grated lower surface.

7. The portable, high temperature oven of claim 2, wherein the flow of air through the combustion chamber flows through a grate.

8. The portable, high temperature oven of claim 2, wherein the chimney is removably attachable to the cook chamber.

9. The portable, high temperature oven of claim 2, wherein cook chamber includes a carry handle.

10. The portable, high temperature oven of claim 2, wherein the cook chamber includes a door.

11. The portable, high temperature oven of claim 2, wherein the cook chamber includes a window.

12. The portable, high temperature oven of claim 2, wherein motor assembly is battery powered.

13. The portable, high temperature oven of claim 2, wherein the motor assembly is removably secured to the cook chamber.

14. The portable, high temperature oven of claim 2, wherein an upper portion of the cook chamber is double-walled.

15. The portable, high temperature oven of claim 1, wherein the firebox is a propane fuel firebox including a propane jet burner configured to cause a flame to be extended into the interior space.

16. The portable, high temperature oven of claim 15, wherein the cook chamber includes collapsible legs.

17. The portable, high temperature oven of claim 15, wherein the firebox is suspended from the cook chamber.

18. The portable, high temperature oven of claim 15, wherein the firebox includes a plurality of propane jet burners.

19. The portable, high temperature oven of claim 15, wherein the firebox includes electric ignitors.

20. The portable, high temperature oven of claim 15, wherein the chimney is removably attachable to the cook chamber.

* * * * *